(12) United States Patent
Sanders

(10) Patent No.: US 11,801,128 B2
(45) Date of Patent: Oct. 31, 2023

(54) OCCLUSAL STOP BITE RESISTOR DEVICES UTILIZED IN SYSTEMS AND METHODS FOR DENTAL TREATMENTS

(71) Applicant: Mavrik Dental Systems, LTD., Ra'anana (IL)

(72) Inventor: Daniel Sanders, Ra'anana (IL)

(73) Assignee: Mavrik Dental Systems, LTD., Ra'anana (IL)

( * ) Notice: Subject to any disclaimer, the term of this patent is extended or adjusted under 35 U.S.C. 154(b) by 705 days.

(21) Appl. No.: 16/701,094

(22) Filed: Dec. 2, 2019

(65) Prior Publication Data

US 2020/0155288 A1 May 21, 2020

Related U.S. Application Data

(63) Continuation-in-part of application No. PCT/US2018/062412, filed on Nov. 26, 2018, which is a continuation of application No. 15/821,989, filed on Nov. 24, 2017.

(51) Int. Cl.
| | |
|---|---|
| *A61C 17/00* | (2006.01) |
| *A61C 19/06* | (2006.01) |
| *A61C 17/028* | (2006.01) |
| *A61C 17/02* | (2006.01) |
| *A61C 17/022* | (2006.01) |
| *A61C 13/15* | (2006.01) |

(52) U.S. Cl.
CPC .......... *A61C 19/066* (2013.01); *A61C 17/022* (2013.01); *A61C 17/028* (2013.01); *A61C 17/0211* (2013.01); *A61C 17/0217* (2013.01); *A61C 19/003* (2013.01)

(58) Field of Classification Search
CPC .......... A61C 17/00; A61C 17/02; A61C 17/24
See application file for complete search history.

(56) References Cited

U.S. PATENT DOCUMENTS

| 9,539,075 B2* | 1/2017 | Sanders | .................... A61C 5/82 |
|---|---|---|---|
| 2017/0079746 A1* | 3/2017 | Sanders | .................... A61C 5/90 |
| 2017/0252117 A1* | 9/2017 | Sanders | ............... A61C 19/003 |
| 2019/0159877 A1* | 5/2019 | Sanders | ............... A61C 19/066 |

* cited by examiner

*Primary Examiner* — Ralph A Lewis
(74) *Attorney, Agent, or Firm* — FRESH IP PLC; Clifford D. Hyra; Aubrey Y. Chen

(57) ABSTRACT

A device, method, and system are provided for treating the oral cavity. The device includes a mouthpiece suitable for implementing a dental treatment, wherein the mouthpiece includes one or more stock elastomeric dental cover layers suitable for forming and maintaining a treatment cavity having a vacuum fluid seal, wherein the dental cover layers includes a layer over all the surfaces of the upper teeth and surrounding gums and/or a layer over all the surfaces of the lower teeth and surrounding gums, wherein each of the layers includes one or more hardened rigid or semi-rigid sections for enabling selected and/or differential collapsibility of the cover layers when exposed to vacuum pressure; and one or more treatment supply layers, and one or more flow channels in fluid communication with the treatment cavity so that the treatment supply layer can deliver and/or remove one or more treatment fluids from the one or more fluid sealed treatment cavities.

18 Claims, 15 Drawing Sheets

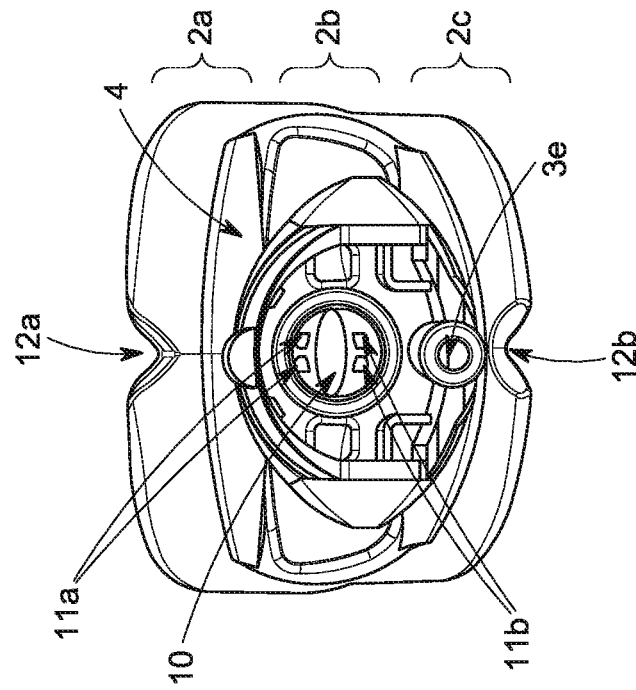
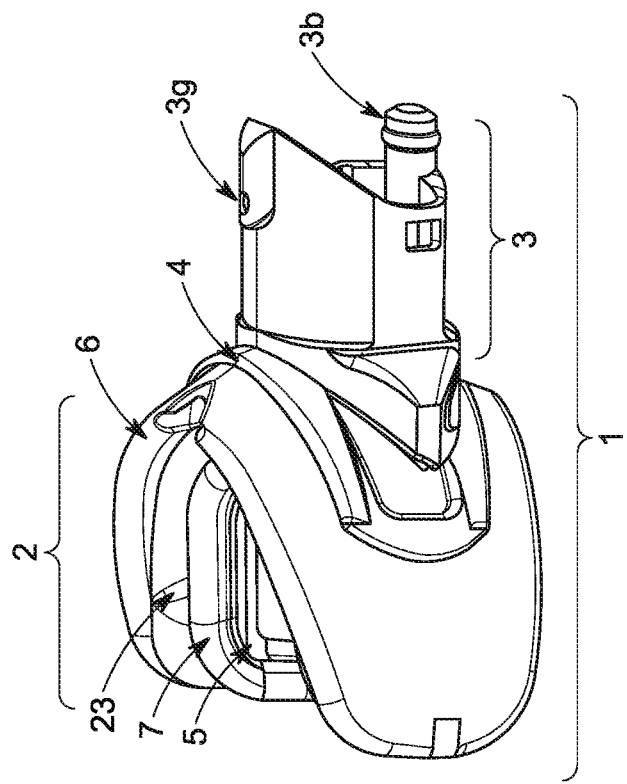

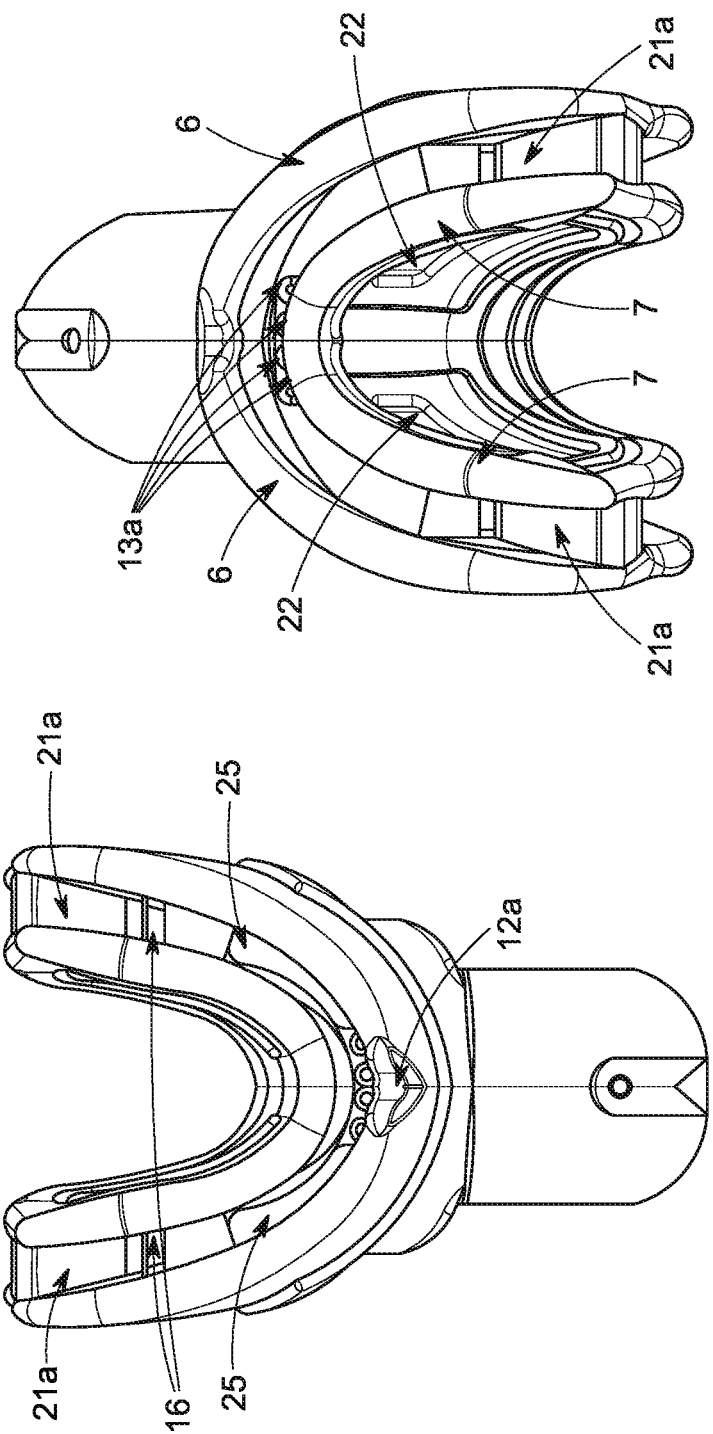

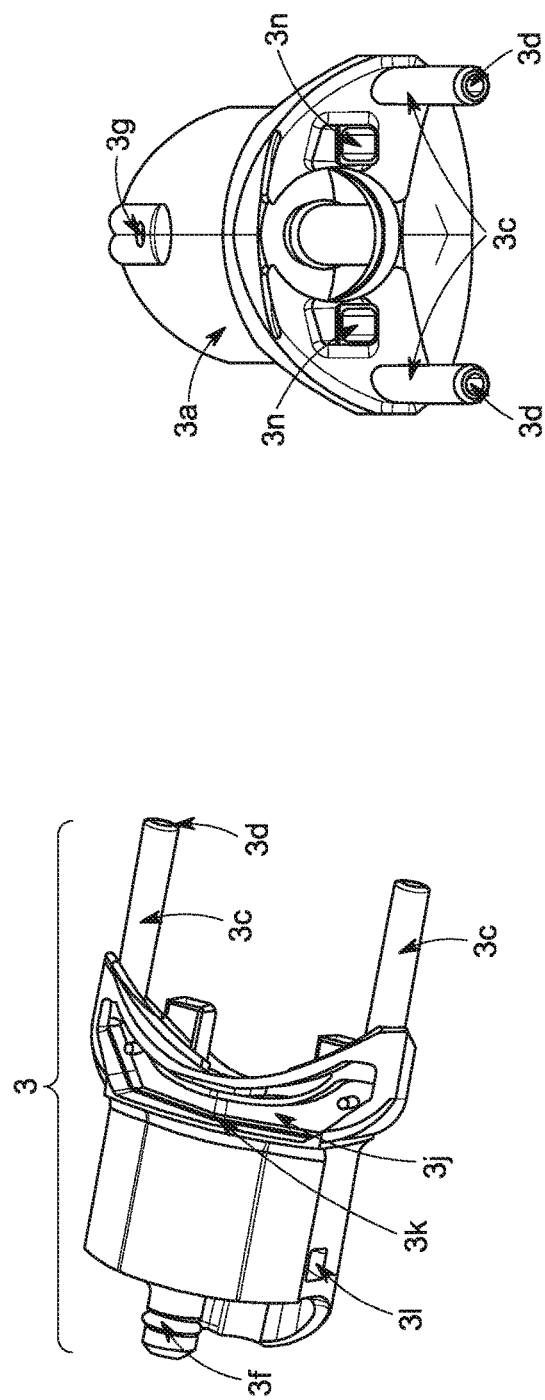
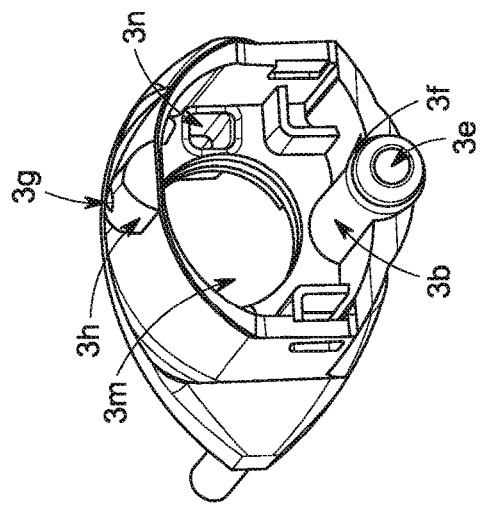
FIG. 5A
FIG. 5B
FIG. 5C

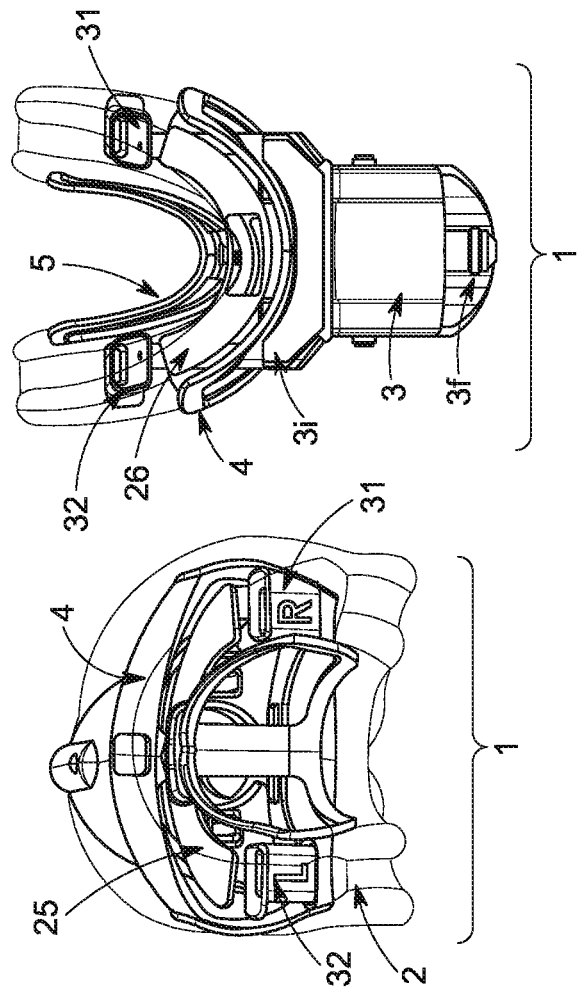
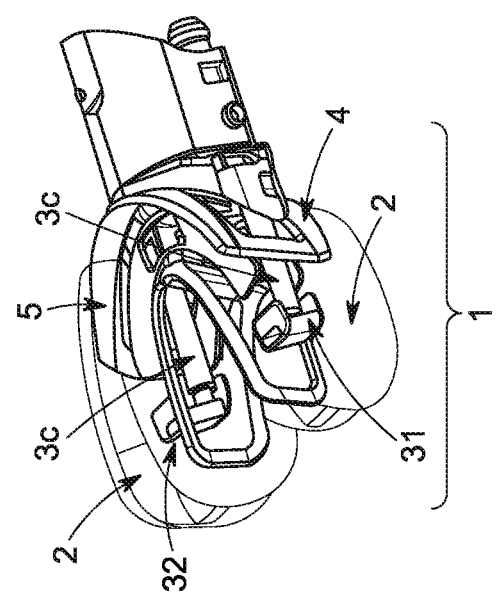
FIG. 11E
FIG. 11D
FIG. 11C

OCCLUSAL STOP BITE RESISTOR DEVICES UTILIZED IN SYSTEMS AND METHODS FOR DENTAL TREATMENTS

CROSS REFERENCE TO RELATED APPLICATIONS

This application is a continuation-in-part of PCT/US18/62412, filed 26 Nov. 2018, entitled "APPARATUS, SYSTEMS AND METHODS FOR DENTAL TREATMENTS", which is a continuation of U.S. patent application Ser. No. 15/821,989, filed 24 Nov. 2017, entitled "APPARATUS, SYSTEMS AND METHODS FOR DENTAL TREATMENTS", which are both incorporated in their entirety herein by reference.

FIELD OF THE INVENTION

The apparatus and method of the present invention relates to dental treatments and more specifically, to teeth and gum treatments.

BACKGROUND OF THE INVENTION

The anatomical area posterior to the terminal teeth on the right and left sides of either the upper and lower jaws is referred to as the retro-molar pad. Custom dental tray appliances are typically fabricated to cover these terminal teeth and their terminal borders around the retro-molar pads. There is significant variability between patients as to the size of their teeth, and the shape of their dental arches. In regards to fabricating a tray to properly cover all the surfaces of the teeth contained within any given arch, the variable width and length of the dental arch and the anatomical relation between the dentulous dental arch and the adjacent retro-molar pads must be considered.

The user is instructed to fill the full arch dental tray with a mild whitening chemical agent (gel) and place the tray on the teeth for up to several hours each day over the course of a minimum of one to two weeks. The custom dental trays cover all the teeth either in the upper or lower jaw. This means that the user can whiten both the front and back teeth with this treatment method using one tray for the upper teeth and one tray for the lower teeth.

SUMMARY OF THE INVENTION

There is provided, in accordance with an embodiment of the present invention, an occlusal stop bite resistor device, for preserving or protecting the vacuum fluid seal of an apparatus, device, method and system for aiding teeth whitening, teeth sensitivity, anti-decay, oral hygiene, gum treatments and more. The device is inserted into a flexible and conformable mouthpiece suitable for implementing a dental treatment, wherein the mouthpiece incorporates one or more fluid sealed treatment cavities inside one or more cover layers of the mouthpiece and wherein said treatment cavities having an air pressure below ambient pressure when a vacuum force is applied internally to the treatment cavities; and wherein each dental cover layer of the mouthpiece includes a cover layer over all the surfaces of the upper teeth and surrounding gums and/or a cover layer over all the surfaces of the lower teeth and surrounding gums; and one or more treatment supply layers wherein the treatment supply layer has one or more flow channels in fluid communication with each treatment cavity so that the treatment supply layer can deliver and/or remove one or more treatment fluids to or from each fluid sealed treatment cavity, optionally high volume quantities, and wherein each dental stock cover layer includes one or more hardened sections for enabling selected/differential collapsibility when the mouthpiece is exposed to a vacuum force and/or biting forces are applied to the device inside the oral cavity.

The occlusal stop bite resistor device(s) of the present invention, when properly inserted into the mouthpiece, prevents the user from biting down into the soft body of the mouthpiece and collapsing the integrity of the internal vacuum line of the mouthpiece thereby preserving or protecting the mouthpiece cover layers from losing vacuum, thereby maintaining the vacuum fluid seal of the mouthpiece, even when severe biting forces are applied intra-orally to the mouthpiece whilst allowing for fluids to be flowed into and out of the treatment cavities of the mouthpiece that has been inserted into the oral cavity.

In some embodiments, two bite resistors are inserted into each mouthpiece, one on the right side of the mouthpiece and one on the left side of the mouthpiece.

In some embodiments the mouthpiece with inserted occlusal stop bite resistors of the present invention may include one or more hardened sections that function as a rigid or semi-rigid exo-skeleton coupled to the soft body mouthpiece.

In some embodiments the mouthpiece with inserted occlusal stop bite resistors of the present invention may include one or more hardened sections that function as a rigid or semi-rigid endo-skeleton embedded or semi-embedded in the soft body mouthpiece.

In some embodiments the mouthpiece with inserted occlusal stop bite resistors in the dental cover layers incorporate rigid stiffening elements on both the buccal and lingual/palatal aspects of the covers. These rigid elements are designed to resist the collapse of the specific areas of the covers (when a vacuum force is applied to the inside treatment cavities of said covers) to which they are attached or embedded/semi-embedded (externally as an "exoskeleton" or internally as an "endoskeleton) so as to create cover layers that is/are differentially collapsible/confirmable to the fully dentulous, semi-dentulous or edentulous gum ridge or ridges they cover when inserted into the mouth. This allows for the cover layers to intimately adapt (by collapsing and being sucked onto) to the gum ridges at their peripheral roll border rims or apron segments and provide a good vacuum fluid seal of the covers to the sides of the upper and or lower gum ridges whilst those areas of the cover layers (soft body of the device) to which the rigid or semi-rigid stiffening members are attached to, resist collapse and maintain a negative space (gap) between the teeth present and surrounding gums covered and the cover layers for the inflow and outflow of treatment fluids onto the teeth and or surrounding gums inside the cover layers.

This unique design of the mouthpiece with inserted occlusal stop bite resistor devices of the present invention, when a vacuum force is applied to the mouthpiece, allows for significant volumes of treatment materials to be flowed inside the treatment cavities of the soft body of the cover layers (both on the buccal and lingual/palatal aspects of the soft body cover layers) and for said treatment materials to remain present on the surfaces of the teeth and our surrounding gums covered by cover layers and contained within the treatment cavities when a vacuum force is applied internally to the mouthpiece so as to create and maintain a fluid seal of the mouthpiece independent of and unaffected by the biting forces that may be applied intra-orally to the mouthpiece when inserted into the oral cavity.

The unique design of the mouthpiece with inserted occlusal stop bite resistors allows for treatment material to be flowed into the mouthpiece treatment cavities under positive pressure while maintaining both a fluid seal around the peripheral roll borders of the mouthpiece to the gum ridges and maintaining a robust negative space for the treatment fluids to fully cover the teeth and or surrounding gums throughout the treatment.

In some embodiments these rigid or semi-rigid stiffening elements may be embedded or semi-embedded (internally or partially internally as an "endo-skeleton") into the cover layers (e.g. the cover layers may be over-molded onto the rigid stiffening elements as is well known in the art).

In some embodiments these embedded or semi-embedded rigid stiffening elements may be connected to each other as a single part for ease of over-molding. This facilitates the clamping and fixation of the endoskeleton to the mold and prevents the displacement of the endoskeleton from its proper position inside the mold when flowing in the over-molding material of the soft body of the mouthpiece into the mold.

In some embodiments, the bite protected sealing mechanism is adapted to prevent saliva from entering the treatment cavity and is adapted to prevent treatment material from exiting the treatment cavity.

In some embodiments, the treatment supply layer of the present invention contains within it (or inserted into it) one or more heaters for heating a treatment material, for heating at least a portion of the treatment cavity; or both.

In some embodiments, the device of the present invention includes a handle integrated into the treatment supply layer suitable for: inserting the one or more dental cover layers over the upper and/or lower teeth and surrounding gums, for adjusting the position of the one or more dental cover layers, for removing the dental cover layers after a dental treatment is completed, or any combination thereof.

In some embodiments, the device of the present invention includes a power line (or inserted into it) for delivering an electrical current to the treatment supply layer and one or more tubes for delivering and/or extracting one or more treatment materials to the treatment supply layer, the handle includes the power line; or both.

In some embodiments, the dental cover layers substantially cover the fully dentulous, semi-dentulous or edentulous gum ridges as previously noted.

In some embodiments, the device of the present invention includes two dental cover layers for simultaneously covering all surfaces of the upper teeth and surrounding gums and all the surfaces of the lower teeth and surrounding gums; at least one treatment supply layer interposed between the two dental cover layers to enable the upper teeth and lower teeth to be treated simultaneously.

In some embodiments, the handle includes one or more inflow tubes for flowing one or more treatment materials into the treatment supply layer(s); and one or more outflow tubes for flowing one or more treatment materials out of the treatment supply layer(s).

In some embodiments, the mouthpiece of the present invention may include: one or more delivery holes for flowing a treatment material from the treatment supply layer to the treatment cavity, and one or more drainage holes for flowing a treatment material from the treatment cavity to the treatment supply layer; and wherein the treatment supply layer includes one or more delivery channels for transporting a treatment material from an inflow tube to the treatment cavity and one or more drainage channels for transporting a treatment material from one or more drainage holes to an outflow tube.

In some embodiments, the delivery holes are located in the anterior sections of treatment cavities of the mouthpiece and the drainage holes are located in the posterior segments of the treatment cavities of the mouthpiece. Physically separating the locations of the inflow and outflow holes allows for the mouthpiece treatment cavities to be substantially filled with treatment materials delivered to the anterior segments of the treatment cavities via the anteriorly located delivery holes before the material is sucked out when an internal vacuum force is applied via the supply layer to the drainage holes located in the posterior segments of the treatment cavities In some embodiments, the dental cover layer includes a compressible rear cavity plug or plugs (located distal to the drainage holes of the treatment cavity or cavities) suitable for fluidly sealing the cavity to prevent material flow out of the rear sides of the vacuum forming cover layer.

In some embodiments, the device of the present invention includes one or any combinations of the following design features: the dental cover layer incorporates highly compressible peripheral roll border aprons or rims to conform to the gum ridges; the treatment supply layer includes within it (or inserted into it) one or more individually controllable heating elements; the dental treatment layer is between upper and lower dental cover layers and the mouthpiece is shaped to mirror a hinge axis angle to facilitate natural jaw movement.

In some embodiments, the above described vacuum fluid seal is formed via the treatment supply layer, by reducing the pressure in the dental treatment cavity or cavities below ambient pressure.

In some embodiments one or two occlusal stop bite resistors are inserted into the mouthpiece.

In some embodiments the occlusal stop bite resistors are configured for either the right or left sides of the mouthpiece.

In some embodiments the occlusal bite resistors shall come in different stock sizes to match the different stock sizes of the mouthpieces into which they are inserted.

In some embodiments the device of the present invention includes the ability to flow into the treatment cavities water or a water/air mixture or air alone between each gel application. This allows for the teeth and our surrounding gums inside the treatment cavities to be washed clean and dried at the end of each treatment material (fluid or gel) application.

In some embodiments, the device may include a pumping system, for pumping one or more treatment materials into the mouthpiece; a multi-position flow control module; and a control unit for automating the dental treatment.

In some embodiments the device allows for the automation of the treatment to include automated multiple cycles of treatment material application (fluid or gels) followed by a washing/drying cycle which then may be repeated automatically for a variable number of cycles per treatment.

In some embodiments, the device includes a disposable elastomeric dental gum guard barrier component for additional protection against treatment materials that can be inserted onto the gum ridges and overlaid by the mouthpiece with inserted occlusal stop bite resistor devices of the present invention without damaging the device's ability to achieve and maintain a vacuum fluid sealed treatment cavity or cavities for the inflow and removal of treatment materials into said treatment cavities without any of said materials leaking out even when substantial or extreme biting forces are applied to the bite resistor devices.

In some embodiments, the occlusal stop bite resistors inserted into the mouthpiece includes a disposable dental gum ridge barrier component which may include a gum treatment layer on its inner surfaces for the delivery of one or more therapeutic material to the gums.

According to some embodiments, a self-clamping, dental gum ridge barrier is provided, that may include a flexible elastomeric three dimensionally arch shaped barrier designed to conform substantially to and snugly self-grip, without the need for any external fixation device, to the gum ridge anatomy of either the maxilla or mandible, and having pre-configured cut-out holes for customized insertion over and through the teeth which acts to provide a fluid sealed dry field wherein when the teeth are inserted through said holes, said individual holes snugly grip circumferentially the erupted anatomical crown portions of the teeth at the gum line positions of these teeth so that the erupted portions of the teeth remain substantially exposed (not covered by the barrier) and the three dimensionally shaped barrier provides a substantially fluid sealed barrier around (and including in between the exposed teeth) to the anatomical gum ridge that it covers.

The dental gum ridge barrier having individual cut out holes for the insertion therethrough of the crown sections of the individually erupted teeth, feature barrier material that covers the spaces between the teeth (the interproximal spaces between the teeth) referred to as inter-dental or inter-proximal tension bridges. These bridges allow for a snug circumferential fit of the self-gripping barrier around the "necks" of each of the individually erupted teeth (at the level of the cemento-enamel junction of the teeth) or more commonly referred to as the level of the gum line of the teeth.

The self-gripping dental gum ridge barrier may be inserted onto the upper and or lower gum ridges prior to the insertion of the mouthpiece with inserted occlusal stop bite resistors of the present invention into the mouth and onto the dentulous or semi-dentulous gum ridges covered by the gum ridge barrier.

In still further embodiments, a method is provided for executing dental treatments, including positioning a mouthpiece with inserted occlusal stop bite resistors of the present invention into the oral cavity, wherein the mouthpiece includes one or more dental cover layers over upper teeth and surrounding gums and/or lower teeth and surrounding gums; applying a vacuum force to the selectively deformable/collapsible dental cover layer or layers so that a fluid sealed treatment cavity or cavities having a pressure below ambient pressure is formed around the teeth and surrounding gums; and flowing one or more treatment materials into the fluid sealed treatment cavity or cavities of the mouthpiece of the present invention and removing them.

In still further embodiments, a method is provided for executing dental treatments including positioning a mouthpiece with inserted occlusal stop bite resistors of the present invention into the oral cavity and onto the already inserted dental gum ridge barriers, wherein the mouthpiece includes one or more dental cover layers over upper teeth and surrounding gums and/or lower teeth and surrounding gums; applying a vacuum force to the selectively deformable/collapsible dental cover layer or layers so that a fluid sealed treatment cavity or cavities having a pressure below ambient pressure is formed around the gum ridge barrier covered gum ridges (whilst the teeth remain exposed inside the cover layers); and flowing one or more treatment materials into the fluid sealed treatment cavity or cavities of the mouthpiece of the present invention and removing them.

In some embodiments, the process includes one or any combination of the following steps: setting up a pump module to connect to a mouthpiece with inserted bite resistors of the present invention designed for a teeth whitening treatment; configuring treatment settings on a control device coupled to the pump module; applying a flow control module to cause a vacuum between the mouthpiece of the present invention and the patient's gum ridge anatomy; inserting a gum guard barrier or barriers over and through the anatomically erupted crown portions of the teeth so as to substantially cover and fluidly seal the gum anatomy surrounding the teeth; inserting the mouthpiece of the present invention into the oral cavity; applying a flow control module to automatically manage delivery of materials in accordance with said treatment settings to the mouthpiece, and/or using a flow control module to remove treatment materials from the mouthpiece.

In some embodiments, the method includes a step of applying flow control to change flow patterns during a treatment, to optimize conformance to a treatment plan as previously noted.

In some embodiments, the method includes a step of monitoring the treatment to track conformance to a treatment plan.

In some embodiments, the method includes a step of monitoring the treatment to identify problems during a treatment.

In some embodiments, the treatment materials differ with respect to the temperature of the materials, with respect to the concentration of the materials, the type of the materials, the viscosity of the materials or any combination thereof.

As described above, the treatment device of the present invention, according to some embodiments, may be a stock item that may be provided is several stock sizes, and which is either reusable or a one-time throw-away item, may include a single dental arch or double dental arch mouthpiece.

The mouthpiece device has flexible side walls with a highly collapsible circumferential deformable apron or roll border that adapts to the upper and lower alveolar gum ridges of the mouth. Each arch formed treatment cavity contains at its distal end (right and left sides) a rear sealing plug feature. The plug is made of a highly deformable material which when bitten into tightly conforms to the anatomy of the crown segment of the tooth that is biting into it. When a vacuum force is applied to the internal cavities of the device of the present invention via the supply layer, the distal plugs in conjunction with the readily deformable (collapsible when a vacuum force is applied to them) circumferential peripheral roll border rims of the device allows for the mouthpiece device to closely adapt to the upper and lower alveolar gum ridges and create an intimate continuous or selectively sustainable fluid seal of the mouthpiece to these anatomical intra-oral structures despite the biting forces applied to the mouthpiece. In some embodiments, the occlusal stop bite resistor device(s) protect the internal vacuum line of the device even when the distal plugs are engaged and deformed on the patient biting into the device so that a vacuum fluid seal of the mouthpiece is maintained.

As previously noted, the other rigid elements of the mouthpiece are designed to prevent the collapsible deformation of those areas of the mouthpiece that correspond internally to the treatment cavities surrounding the teeth and immediate surrounding gums to maintain an internal negative space around the teeth and surrounding gums when treatment materials are flowed into them whilst a vacuum force has been applied to the mouthpiece and a fluid seal has been achieved to said treatment cavities. The mouthpiece device of the present invention also incorporates in its middle layer, multiple flow channels with outlets and inlets and one or more heating elements (that may also be inserted into it) whose temperature can be individually controlled by a microprocessor unit contained within a control unit. In some embodiments, these heating elements may include a spiral metal component covered by a metal tube. The spiral metal component may be hollow and contain an electrical heating element which when electrically heated conductively heats the surrounding metal elements.

Treatment material flowed through the sheathed spiral component will be conductively heated as it flows directly through the sheathed heated spiral element. Printed circuit boards (which may be flexible) can be incorporated to provide temperature control of the heating elements and so control the resultant heating and temperature of the gel flowed through said heating module and exiting it.

The entire heating module unit may be in some embodiments sheathed inside a housing (of plastic or other suitable materials) to allow comfortable handling of the heating module unit when it is heated.

The microprocessor unit can control electrical power, time duration, alarms, sensors, individual or multiple heat emitting elements, pumps, motors, and other controls. As previously noted, several different types and sizes of disposable customizable or stock separate self-gripping gum protector/guard elements can be inserted into the mouth prior to inserting the mouthpiece and used in conjunction with the device without damaging the ability of the device to form and maintain fluid sealed treatment cavities.

A pump component can be used to create a vacuum within the treatment cavities of the mouthpiece device. Differing concentrations of different treatment materials can be delivered in a controlled manner via said pump and flexible tubing connected to a heating module unit that is fluidly connected to the mouthpiece device.

Pressure sensors are integrated into the system to monitor volume and flow rate of the gel and vacuum seal integrity of the mouthpiece in the mouth while treatment materials are delivered into the mouthpiece. Whitening gel agents can similarly be delivered and removed from the device in a controlled manner by said system. Similarly, fresh water or a mixture of water and air or air alone can be delivered to and removed from the mouthpiece device to rinse or flush away any remaining gel residue from the teeth and dry the teeth and or surrounding gums and the inner surfaces of the treatment cavities of the mouthpiece after each gel application.

An optional tooth shade matching sensor unit to record pre-treatment and post-treatment tooth shade values may be incorporated into the control unit.

According to various aspects of the invention, the occlusal stop bite resistor devices inserted into the above described mouthpiece for providing a dental treatment may include a deformable gum sealing portion for covering a gum ridge; a pair of distal tooth sealing portions, wherein the gum sealing portions and the distal teeth sealing portions define a gap between at least a portion of the device and the tooth over which it lies; and at least one fluid conduit portion for passing a fluid into or out of the treatment cavity; wherein the placement in a patient's mouth over a plurality of teeth and surrounding gum, the gum sealing portions contact and deforms against a gum ridge of the patient for forming intimate contact with both sides of the gum ridge, and the distal teeth sealing portions deforms against distally located teeth for substantially defining a seal at the distal tooth or teeth, so that a fluid can be introduced, removed, or both from the treatment cavity while maintaining a fluid seal despite the biting forces applied to the mouthpiece with the deformable gum sealing and tooth sealing components when a vacuum force is internally applied to the device of the present invention.

According to some embodiments, a device is provided that includes a mouthpiece suitable for implementing a dental treatment, wherein the mouthpiece includes: i. one or more stock compressible dental cover layers suitable for forming one or more fluid sealed treatment cavities having a vacuum below ambient pressure when an internal vacuum force is applied, wherein each dental cover layer includes a layer over the upper teeth and surrounding gums and/or a layer over the lower teeth and surrounding gums; and ii. one or more treatment supply layers wherein the treatment supply layer has one or more flow channels in fluid communication with the treatment cavity so that the treatment supply layer can separately deliver and/or remove one or more treatment fluids from the treatment cavity, wherein each dental stock cover layer includes one or more hardened rigid or semi-rigid sections for enabling selected collapsibility when exposed to a vacuum force; and wherein one or more occlusal stop bite resistor elements are inserted into the cover layers to resist biting forces.

In some embodiments, the one or more hardened sections is a rigid or semi-rigid exo-skeleton adhesively coupled to the compressible soft body portion of the mouthpiece.

In some embodiments, the one or more hardened sections is a rigid or semi-rigid endo-skeleton partially or fully embedded in the compressible soft body of the mouthpiece.

In some embodiments, treatment materials are flowed onto both the buccal and lingual/palatal aspects of the treatment cavity of the differentially compressible cover layer and remain present on the surfaces of the teeth and our surrounding gums when a vacuum force is applied and maintained to the mouthpiece.

In some embodiments, the one or more occlusal stop bite resistor elements for resisting biting forces are internally located in the compressible soft body of the mouthpiece to allow for full insertion of both the upper teeth and surrounding gums and the lower teeth and surrounding gums into the treatment cavities of the mouthpiece.

In some embodiments, the dental cover vacuum is formed using a continuous sealing mechanism that includes a sealing rim formed of a compressible material in conjunction with one or more sealing plugs attachable to the rear opening(s) of the dental cover layer, wherein the sealing mechanism fluidly seals the treatment cavity when a vacuum force is internally applied to the dental cover layer.

In some embodiments, the one or more rigid elements for resisting biting forces are designed to maintain vacuum fluid seal of the cover layer when biting forces are applied to the cover layers.

In some embodiments, the one or more elements for resisting biting forces allow for the delivery and/or removal of one or more treatment fluids from the supply layer to the treatment cavity, when biting forces are applied to the supply layer.

In some embodiments, the one or more devices for resisting biting forces protect from biting forces the one or more treatment supply layers wherein the treatment supply layer has one or more flow channels in fluid communication with the treatment cavity so that the treatment supply layer can deliver and/or remove one or more treatment fluids from the treatment cavity when a vacuum force is internally applied to the cover layer and biting forces are applied to the treatment supply layers.

In some embodiments, the sealing mechanism is adapted to prevent saliva from entering the treatment cavity and is adapted to prevent treatment material from exiting the treatment cavity.

In some embodiments, the treatment supply layer includes one or more heaters for heating a treatment material, for heating at least a portion of the treatment cavity; or both.

In some embodiments, the device includes a handle integrated into the treatment supply layer suitable for: inserting the one or more dental cover layers over the upper teeth and surrounding gums and/or lower teeth and surrounding gums, for adjusting the position of the one or more dental cover layers, for removing the dental cover layers after a dental treatment is completed, or any combination thereof, and for securely connecting with a fluid seal to a heating unit connected to a fluid and or vacuum supply line.

In some embodiments, the device includes a power line for delivering an electrical current to the treatment supply layer and one or more tubes for delivering and/or extracting one or more treatment materials to the treatment supply layer, the handle includes the power line; or both.

In some embodiments, the dental cover layer covers the gum ridges.

In some embodiments, the device includes two dental cover layers for covering the upper teeth and surrounding gums and the lower teeth and surrounding gums; at least one treatment supply layer interposed between the two dental cover layers to enable the upper teeth and surrounding gums and lower teeth and surrounding gums to be treated simultaneously; wherein the device includes one or more breathing vents in the treatment supply layer suitable for providing an air passage into the mouth during a dental treatment.

In some embodiments, the handle includes one or more inflow tubes for flowing one or more treatment materials into the treatment supply layer(s); and one or more outflow tubes for flowing one or more treatment materials out of the treatment supply layer(s).

In some embodiments, the mouthpiece includes: one or more delivery holes for flowing a treatment material from the treatment supply layer to the treatment cavity, and one or more drainage holes for flowing a treatment material from the treatment cavity to the treatment supply layer; and wherein the treatment supply layer includes one or more delivery channels for transporting a treatment material from an inflow tube to the treatment cavity and one or more drainage channels for transporting a treatment material from one or more drainage holes to an outflow tube.

In some embodiments, the mouthpiece includes: one or more delivery holes located in the anterior segments of the mouthpiece for flowing a treatment material from the treatment supply layer to the treatment cavity, and one or more drainage holes in the posterior segments of the mouthpiece for flowing a treatment material from the treatment cavity back to the treatment supply layer; and wherein the treatment supply layer includes one or more delivery channels for transporting a treatment material from an inflow tube to the anterior segments of the treatment cavity and one or more drainage channels for transporting a treatment material from one or more drainage holes located in the posterior segments of the cavity to an outflow tube of the supply layer.

In some embodiments, the dental cover layer includes one or more compressible posterior cavity plugs located distal to the drainage holes and suitable for sealing the cavity to prevent material flow out of the rear sides of the vacuum forming layer independent of the anatomical location of the intra-oral retro-molar pad.

In some embodiments, the device includes one or any combinations of the following design features: the dental cover layer incorporates a circumferential roll border apron design to conform to the buccal and or palatal/lingual aspects of the gum ridges; the dental treatment supply layer is between upper and lower dental cover layers and the mouthpiece is shaped to mirror a hinge axis angle to facilitate natural jaw movement.

In some embodiments, the fluid sealed vacuum is formed via the treatment supply layer, by reducing the pressure in the one or more dental treatment cavities below ambient pressure and maintains said vacuum when flowing treatment materials into said dental treatment cavities.

In some embodiments, the device includes an elastomeric dental gum guard component that is adaptable to selectively cover the upper and or lower gum ridges for additional protection against treatment materials.

In some embodiments, the device includes a dental gum guard component which includes a gum treatment layer on its inner surfaces for the delivery of one or more therapeutic material to the gums.

In some embodiments, a self-gripping dental gum guard is provided, that includes a flexible elastomeric arch shaped barrier designed to conform substantially to the gum ridge anatomy, and having pre-configured individual cut-out holes for customized insertion over and through the erupted anatomical crown portions of the individual upper and or lower teeth which acts to provide a fluid sealed dry field.

In some embodiments, the self-gripping dental gum guard barrier includes multiple built in channels on its buccal, occlusal and or lingual/palatal aspects that are pre-filled with light curable resin materials for enhancing the selective fit and selective fluid seal of the gum guard barrier to the upper and or lower gum ridges.

According to some embodiments, a method is provided for executing dental treatments, including: positioning a mouthpiece including one or more dental cover layers over upper teeth and surrounding gums and lower teeth and surrounding gums; positioning one or more occlusal stop bite resistor elements into the mouthpiece; applying a fluid sealed vacuum to the dental cover layers so that fluid sealed treatment cavities of the cover layers having a pressure below ambient pressure is formed around the teeth and surrounding gums; and flowing one or more treatment materials into the fluid sealed treatment cavities, wherein the dental cover layers include one or more hardened rigid or semi-rigid sections for enabling selected/differential collapsibility of the mouthpiece cover layers when exposed to the applied vacuum force and; flowing out one or more treatment materials from the fluid sealed treatment cavities to a waste container.

In some embodiments, the process includes one or any combination of the following steps: setting up a pump module to connect to a mouthpiece designed for a teeth whitening treatment of both the upper and lower teeth; configuring treatment settings on a control device coupled to the pump module; applying self-gripping upper and lower gum guard barrier devices selectively onto the respective gum ridges where the erupted portions of the teeth remain substantially exposed; applying flow control to cause a vacuum fluid seal between the mouthpiece and the patient's gum guard covered gum ridge anatomy; and applying flow control to automatically manage delivery of materials in accordance with said treatment settings, and/or using a flow control module to remove treatment materials from said mouthpiece.

In some embodiments, the method includes a step of monitoring the treatment to track conformance to a treatment plan.

In some embodiments, the method includes a step of monitoring the treatment to identify problems during a treatment.

In some embodiments, the treatment materials differ with respect to the temperature of the materials, with respect to the concentration of the materials, or both.

In some embodiments, the method is used for executing a teeth whitening treatment.

According to some embodiments, a device is provided that includes: a. a deformable selective elastomeric gum ridge sealing portion for covering a gum ridge; b. a deformable cover layer portion with a treatment cavity that contains a pair of deformable distal tooth sealing portions, wherein the gum ridge sealing portion and the cover layer with distal tooth sealing portions define a gap between at least a portion of the device and the tooth and surrounding gum ridge over which the gum ridge sealing portion lies; and c. at least one fluid conduit portion for passing a fluid into or out of the treatment cavity of the cover layer; wherein on the placement in a patient's mouth over a plurality of teeth and surrounding gums, the gum ridge sealing portion contacts and deforms against a gum ridge of the patient for forming intimate contact with the gum ridge, and the cover layer with a pair of distal tooth sealing portions deforms against the gum ridge sealing portion and the distally located tooth or teeth for substantially defining a seal between the gum ridge sealing portion and the cover layer and for substantially defining a seal at the distal tooth independent of the location of the retro-molar pad, so that a fluid can be introduced, removed, or both from the treatment cavity of the cover layer while maintaining a seal between the deformable gum ridge sealing portion and the tooth sealing and gum ridge sealing components of the cover layer, and wherein the deformable cover layer portion includes one or more hardened rigid or semi-rigid sections for enabling selected/differential collapsibility of the cover layer against the gum ridge sealing portion when the cover layer treatment cavity is internally exposed to a vacuum force and substantial intra-oral biting forces are applied to the device.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein:

FIG. 1a is a side view of one embodiment of the mouthpiece 1 of the present invention comprised of four main components; namely a soft body 2 made of elastomeric materials such as silicone or thermoplastic elastomers, a mouthpiece coupler 3 made of hard plastic materials; a rigid stiffening element 4 on the buccal aspects of the soft body 2 and a rigid stiffening element 5 on the lingual/palatal aspects of the soft body 2, according to some embodiments;

FIG. 1b is a front view of the mouthpiece, according to some embodiments;

FIG. 2a is a top/front view of FIG. 1a, according to some embodiments;

FIG. 2b is a top/rear view of FIG. 1a, according to some embodiments;

FIG. 5a is bottom view of one embodiment of the mouthpiece coupler 3, according to some embodiments;

FIG. 5b is an angled front view of the mouthpiece coupler 3, according to some embodiments;

FIG. 5c is a rear view of the mouthpiece coupler 3, according to some embodiments;

FIG. 11c is an angled side view of the Right side 31 and Left side 32 occlusal stop bite resistors inside a transparent view of the mouthpiece 1, according to some embodiments of the present invention;

FIG. 11d is a rear view of the Right side 31 and Left side 32 occlusal stop bite resistors inside a transparent view of the mouthpiece 1, according to some embodiments of the present invention;

FIG. 11e is a bottom view of the Right side 31 and Left side 32 occlusal stop bite resistors inside a transparent view of the mouthpiece 1, according to some embodiments of the present invention;

Figure 3B:
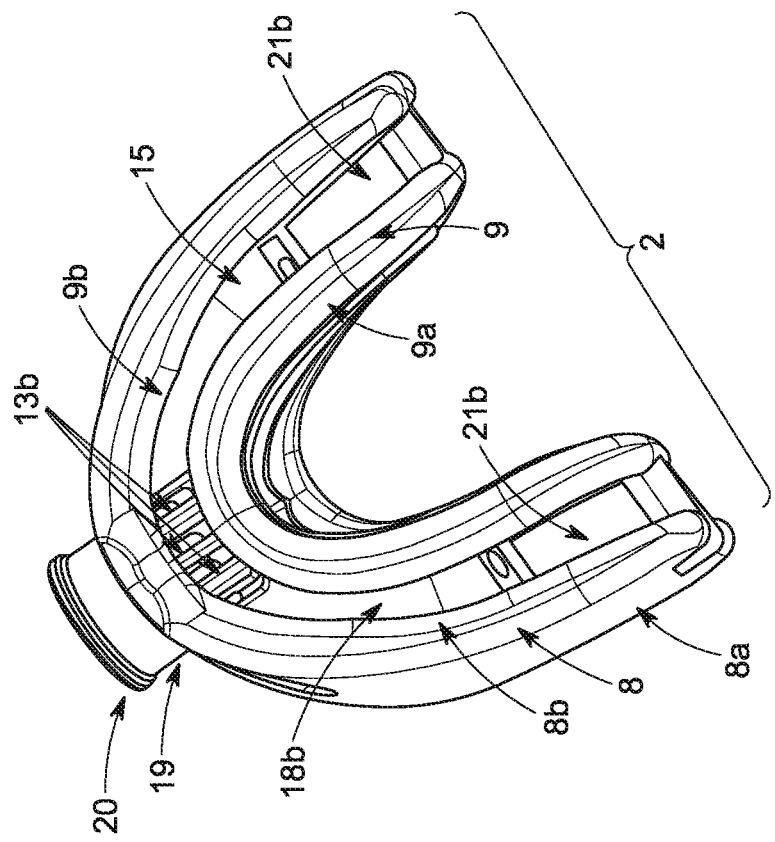
FIG. 3b is an angled bottom view of the soft body 2 of FIG. 1a, according to some embodiments.

It will be appreciated that for simplicity and clarity of illustration, elements shown in the drawings have not necessarily been drawn to scale. For example, the dimensions of some of the elements may be exaggerated relative to other elements for clarity. Furthermore, certain quantities of elements have been depicted, in accordance with specific embodiments, however other embodiments may be provided with fewer or more elements, such as holes, pins, heating elements, tubes etc. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, rather is to be accorded the widest scope consistent with the principles and novel features herein disclosed. In other instances, well-known methods, procedures, and components have not been described in detail so as not to obscure the present invention.

Preferred dental treatments employ one or more chemicals, medications or other treatment related materials, optionally low, medium or high volumes, that interact with the teeth and/or gums. Embodiments of the present invention enable increasing the efficiency and effectiveness of the dental treatments, by applying a vacuum force to a mouthpiece that is composed of soft collapsible materials, and hardened rigid or semi-rigid sections that are resistant to collapse. Such embodiments enable delivery of selectively engineered or designed sealed treatment cavities or zones, which can be selectively resistant to biting forces, and where treatment materials may be optimally applied and may also be prevented from escaping outside of the sealed treatment cavity. Non-limiting embodiments of the invention include a dental treatment apparatus or device, method and system, where teeth whitening, gum treatment, tartar removal, teeth desensitizing, anti-decay, and other treatments can be delivered to one or more selected target treatment cavities and the hard or soft tissues contained therein.

Embodiments of the present invention include a dental treatment mouthpiece with inserted occlusal stop bite resistors that may include a single or double dental arch cover layers. The mouthpiece may include one or more dental cover layers for covering the upper teeth and surrounding gums and/or the lower teeth and surrounding gums. A dental cover layer preferably in the shape of an arch, such as a dental arch, configured for fitting over either the bottom teeth or the upper teeth and respective surrounding gums. For example, the mouthpiece may include an upper dental cover layer and a lower dental cover layer (e.g., the mouthpiece may include a double dental arch). The dental cover layer may have a dental arch treatment cavity that covers the teeth and surrounding gums. A particularly preferred mouthpiece includes two dental cover layers, each having a dental arch treatment cavity, where the two dental cover layers are co-joined to create a single device with occlusal stop bite resistors inserted between the upper and lower cover layers. It will be appreciated, according to the teachings herein, two co-joined dental cover layers may be joined via one or more additional layers, such as one or more treatment supply layers.

The mouthpiece, according to some embodiments of the present invention, allows for the use of generic or stock deformable mouthpieces in patients, such that the variable widths and lengths of the patients' full dental arches can be handled, without the need to fabricate a custom-made mouthpiece for each patient. When using such stock mouthpieces, embodiments of the present invention enable the maintenance of a continuous vacuum fluid seal of the mouthpiece to the given dental arch gum ridge onto which it is placed. The distal plugs of the mouthpiece are highly deformable so that when the patient is instructed to bite down into the mouthpiece, the plugs will readily deform around the coronal segments of the terminal tooth or teeth without harming the vacuum fluid seal. This intimate fit of the improved mouthpiece of the present invention to any given dental arch is independent of the length and width of the dental arch to which it is to be fitted and independent of the position of the right or left terminal teeth of any given dentulous or semi-dentulous dental arch to their respective retro-molar pads.

The dental treatment mouthpiece may be reusable or disposable after a single use. The mouthpiece may be constructed in various generic or stock sizes (e.g., small, medium, large, extra-large) or may be customized, for covering both the upper and lower teeth and respective surrounding gums of the gum ridges. The mouthpiece may include the insertion into it of one or more heating elements for heating a dental treatment fluid or material for heating treatment fluid materials prior to flow into the mouthpiece, optionally using inline direct conductive heating provided by a temperature controlled heating module unit fluidly connected to the mouthpiece device of the present invention.

According to some embodiments, the rigid occlusal stop bite resistors (right and left sides) of the present invention are inserted into pre-formed vacuum tube bore hole cavities of the soft body of the mouthpiece in a proximal relationship to the distal posterior (right and left sides) sealing plugs.

According to some embodiments, the occlusal stop bite resistors are sufficiently rigid to withstand and not break or deform and maintain their structural integrity and dimensions even when large biting forces are applied onto them by the upper and lower teeth and jaws and muscles of mastication. In some cases, these forces may reach 500 Newtons or 1,000 Newtons or more of applied force onto the occlusal stop bite resistors.

Each rigid occlusal stop bite resistor occlusal bite stop, according to some embodiments, may include a hollow rigid vertical strut with incorporated occlusal plane bite stops on the superior and inferior terminal ends of each device. When the bite resistors are fully inserted into their respective cavities of the mouthpiece, these occlusal plane bite stops are positioned to prevent the user when biting into the mouthpiece from collapsing both the soft body vacuum tube posterior bore hole and the internal vacuum supply line of the soft body of the mouthpiece into both of which is inserted the occlusal stop bite resistor.

The rigid occlusal plane bite stops (superior and inferior), according to some embodiments, are positioned to allow the upper and lower teeth to fully insert into the upper and lower halves of the mouthpiece. This is very important as the posterior distal plugs must be engaged, compressed and deformed by the posterior upper and lower teeth on both the right and left sides posterior aspects of the mouthpiece (without any interference from the occlusal bite stops) in order to establish and maintain a good fluid seal of the posterior right and left sides of the mouthpiece by creating circumferential vacuum seal of the upper and lower cover layers of the mouthpiece when a vacuum force is applied to treatment cavities of the mouthpiece.

If the rigid occlusal bite plane stops of the bite resistors sit at a level that is above the occlusal plane of the centric relation of the teeth when the teeth are fully engaged and closed inside the mouthpiece, the occlusal bite plane stops would not allow the teeth and surrounding gums to site properly inside the mouthpiece and therefore there would not be good engagement and deformation of the distal posterior plugs by the posterior teeth and there would not be good vacuum seal of the posterior distal plugs as well as improper full coverage of all the surfaces of the teeth and surrounding gums by the cover layers. Conversely, if the rigid occlusal plane bite stops are too low they will not adequately protect the internal vacuum line of the soft body of the mouthpiece and the user on biting could collapse the internal vacuum line resulting in loss of vacuum fluid seal of the mouthpiece inside the user's mouth when flowing in and out of the mouthpiece treatment materials.

Due to the posterior positioning of the rigid occlusal stop bite resistors in the mouthpiece, the resistors are highly effective in preventing the user from being able to exert maximal forces of the biting/chewing muscles of the lower jaw. Positioning the bite resistors in a relatively distal position in the mouthpiece creates effective occlusal stops due to the hinge axis nature of the temporo-mandibular joint of the mandible to the fixed maxilla of the skull and the associated muscles of mastication of the maxilla and mandible.

The bite resistors rigid occlusal plane bite stops (superior and inferior), according to some embodiments, each create posterior bite stops (rigidly supported by the vertical strut of the bite resistor) for the right and left maxillary and mandibular teeth.

The occlusal stop bite resistors, in some embodiments, each (right and left sides) incorporate a rigid extension tube that is angled to project proximally into the internal right and left vacuum tubes respectively of the soft body of the mouthpiece.

These rigid extension tubes, in some embodiments, further protect the internal vacuum lines from being collapsed by any biting forces of the user when the mouthpiece is inserted into the oral cavity and a vacuum force is internally applied to the mouthpiece to create and maintain a fluid sealed upper and lower treatment cavities of the upper and lower cover layers of the mouthpiece during the delivery and removal of treatment fluids into and out of the mouthpiece.

The rigid occlusal stop bite resistor devices, according to some embodiments of the present invention, are designed to not interfere with the selective collapse of certain soft elements of the mouthpiece and in particular the buccal and palatal/lingual roll borders of the upper and lower halves of the mouthpiece onto the alveolar gum ridges of the upper and lower jaws when an internal vacuum force is applied to the upper and lower treatment cavities of the upper and lower cover layers of the mouthpiece.

The rigid occlusal stop bite resistor devices, according to some embodiments of the present invention, protect from biting forces the posterior bore holes and internal vacuum line force applied internally to the mouthpiece's upper and lower treatment cavities of the upper and lower cover layers so that the cover layers press and adapt snugly to the upper and lower alveolar ridges to so maintain a fluid seal of the upper and lower treatment cavities of the mouthpiece when treatment fluids are flowed into and removed from these internal treatment cavities of the cover layers.

The dental treatment mouthpiece may be employed in a system including one or more control units, such as a control unit including a microprocessor. The control unit may be an external control unit. The control unit may control the temperature of one or more heating elements. The control unit may control a mouthpiece having a double dental arch each having a dental arch treatment cavity so that the simultaneous treatment of both the upper and lower teeth and/or respective surrounding gums are controlled.

An arch of the dental mouthpiece (e.g., each arch of a co-joined double arch mouthpiece) preferably has a dental cover layer with an arch-shaped well or other design suitable for forming a treatment cavity that may, when flowed into it, contain one or more dental treatment fluids. For example, the arch-shaped well treatment cavity may contain a dental fluid that includes a predetermined concentration of an active ingredient. The active ingredient may be any chemical that is suitable for whitening teeth in situ, or for performing other dental treatments. A particularly preferred active ingredient for tooth whitening, for example, includes one or more peroxides. The active ingredient may be activated or have a reactivity that is otherwise accelerated or potentiated (e.g., catalyzed or otherwise) by heat. The treatment fluid (e.g., the treatment fluid including an active ingredient may be delivered via a pumping system (e.g., an automatic pumping system), via a vacuum, or both, into the treatment cavity sections of the mouthpiece. Preferably, while in the treatment cavity, the treatment fluid substantially covers the natural crown portions of the teeth (e.g., the teeth subject to a treatment). Alternatively, while in the treatment cavity well, the treatment fluid may also substantially cover that portion of the gum tissue surrounding the crown portions of the teeth (e.g.; the gums subject to a treatment).

The sealed compartment (i.e., sealed treatment cavity) around the teeth and surrounding gums formed by the treatment cavity well of the dental cover layer may be employed for delivering one or more treatment materials to the erupted crown portions or surrounding gums of a plurality of teeth. For example, a sequence of two or more different treatment fluids or cleaning/washing fluids or air flow may be passed through the sealed compartment. Without limitation, the treatment fluids may include one or more preparation fluids, one or more active treatment fluids, one or more medications, one or more neutralization fluids, one or more rinsing fluids, air flow in combination with rinsing fluids or air flow alone for drying, or any combination thereof. Preferably the treatment fluids include one or more whitening treatment fluids, rinsing fluids, medications, or other treatment materials. The whitening treatment fluid, for example, may include any art known active and/or any non-active ingredients for whitening teeth. Without limitation, the whitening treatment fluid, for example, may include one or any combination of the features of the fluid compositions described in U.S. Pat. No. 7,189,385 (see e.g., column 1, line 2 through column 18 line 40); U.S. Pat. No. 6,770,266 (see e.g. column 2, line 9 through column 6, line 35), U.S. Pat. No. 6,746,679 (see e.g., column 1, line 13 through column 11, line 18); U.S. Pat. No. 5,668,934 (see e.g., column 1, line 33 through column 16, line 10); U.S. Pat. No. 7,601,002 (see e.g., column 1, line 11 through column 16, line 8); US Patent Application Publication Nos. 2008/0063612 (see e.g., paragraphs 11 through 165); 2005/0214720 (see e.g., paragraphs 10 through 102); and 2004/0185013 (see e.g., paragraphs 3 through 150); each incorporated herein by reference. Any of the treatment fluids may be a liquid that flows under gravitational forces, or a gel that does not flow under gravitation forces. The treatment fluid preferably can be pumped and/or flows under a vacuum. Preferably any treatment fluid that may be damaging to soft tissue of the oral cavity (e.g., gums or other soft tissues) is in the form of a sufficiently high viscosity fluid or gel so that the fluid does not flow out of the sealed compartment surrounding the teeth being treated. For example, such treatment fluid may have a viscosity of about 0.1 Pa·s or more, about 1.0 Pa·s or more, about 10.0 Pa·s or more, about 100 Pa·s or more, or about 1000 Pa·s or more.

One or more of the treatment fluids may be heated for decreasing the viscosity, for increasing the reactivity, or both. For example, increasing the temperature of the treatment fluid, such as a whitening agent (hereinafter referred to as gel, although high viscosity fluids may be employed according to the teachings herein) may increase the rate of peroxide decomposition to create larger volumes of oxygen free radicals from the gel and so may increase the resultant whitening effect in the enamel surfaces of the teeth. Of course, other treatment materials may be used, including water, salt, gasses, chemical and/or biological medicament solutions, or other materials, compounds etc. Each treatment cavity (e.g., arch-shaped treatment cavity) of the dental covering layer may contain one or more inlet holes) for the delivery of treatment materials into each treatment cavity, as well as outlet (i.e., drainage) holes (e.g. one or more outlet holes on each of the right and left sides of the treatment cavity arch shaped cavity, for the removal of treatment materials from each dental arch treatment cavity.

The components, devices, systems and methods according to the teachings herein may advantageously be employed in various dental treatments, such as an accelerated whitening treatment, tarter removal treatment, gum treatments etc. By employing treatment fluids both in low-volume and high-volume quantities (e.g., a whitening fluid, such as a whitening gel, medications, treatment materials etc.) having a high temperature, having a high concentration of active ingredient, or both, the efficiency of treatment may be increased so that the treatment is accelerated and/or enhanced. It will be appreciated that the whitening treatment, for example, may be achieved without the need for photodynamic therapy. An accelerated dental treatment may be accomplished by heating the dental treatment fluid. Although room temperature treatment may be employed, some or all of the treatment fluid preferably is heated to a temperature of about 27° C. or more, more preferably about 30° C. or more, even more preferably about 34° C. or more, even more preferably about 38° C. or more, even more preferably about 48° C. or more and most preferably about 56° C. or more. Of course, higher or lower temperatures may be used as may be necessary. The treatment fluid in the treatment zones (i.e., in the sealed treatment cavity formed by the dental cover layer) may have a generally uniform temperature or may have varying temperatures. It will be appreciated that similar increases in treatment rates may be achieved using higher concentration of active ingredient in the treatment fluid.

The dental cover layer(s) preferably has a circumferential peripheral roll border rim formed of a sufficiently soft material and arranged so that the roll border rim will compress and deforms to fit snugly against the sides of the gum ridges of the upper and lower jaws. The roll border rim/s may thus create a sealed cavity in conjunction with the rear compressible plugs (e.g., formed from the cavity well of the dental cover layer) with the erupted crowns of the teeth and surrounding gums contained within the cavity.

The improved mouthpiece of the present invention may incorporate one or more air breathing vents. Preferably, the breathing vents are designed to penetrate through a treatment supply layer of the mouthpiece without compromising the ability of this treatment supply layer to flow one or more treatment materials into the treatment cavity wells (e.g., arch-shaped cavity wells) of the dental cover layers, without compromising the ability of this treatment supply layer to drain one or more treatment fluids from the dental cover layer, or both. For example, the breathing vents may be integrated into a treatment supply layer in a manner that allows for flow of one or more treatment fluids into and out of the mouthpiece.

The sealing roll border rims, preferably made of a soft deformable material, may have a generally rounded shape, such as a shape that forms a highly deformable apron so that when a vacuum force is applied to the inside of the mouthpiece acts to collapse these roll borders onto the gum ridges and fluidly seal the mouthpiece device (e.g., the dental cover layer) of the present invention to the gum ridges in conjunction with the rear distal sealing plugs of the cover layers. The sealing preferably may be partially or entirely accomplished by a patient biting down onto the mouthpiece. The sealing rims may effectively seal the treatment cavity well of the dental cover layer so that the treatment materials (i.e., the treatment fluids) delivered to the mouthpiece are prevented from leaking into the oral cavity. The sealing may be partially or entirely accomplished by the application of a vacuum. For example, when a vacuum is applied, the sealing roll border rims may be readily collapsed and sucked up against the side walls of the gum ridges. A treatment fluid that is pumped into a fluid sealed treatment cavity well of a dental cover layer preferably contacts the respective teeth on the front surface, the top surface, the back surface, or any combination thereof. More preferably, the treatment fluid contacts the teeth on the front and back surfaces. Even more preferably, the treatment fluid contacts the teeth on all of the exposed surfaces of the teeth. The sealing effect of the highly deformable apron and/or sealing roll border rims may be accomplished or enhanced by the ability of the treatment system to remove (e.g., suck out) the air within the mouthpiece utilizing an external pump in order to achieve a vacuum fluid seal of the mouthpiece to the upper and/or lower gum ridges of the upper and/or lower jaws.

Due to the fact that there is great variation in the length of the dental arches between individuals, it may be difficult or even impossible to effectively use a generic stock dental arch to seal the rear-most region of the well of the dental cover layer. For example, it may be difficult or impossible to effectively seal the areas corresponding to the terminal right and/or left tooth in any given dental arch. Without a sufficient seal in these areas, the treatment fluid may undesirably leak out of one or more sides (i.e., the right side, the left side or both) of one or both of the upper or lower arch well rear portions through these large unsealed openings. Such unsealed openings (i.e., unsealed regions) may also prevent the creating and/or maintaining of a vacuum seal of the dental treatment cavity wells without providing for some means to seal off these open areas. Forming a vacuum seal between a dental cover layer and a retro-molar pad may face hurdles such as having to select or prepare a dental cover layer of sufficient length and possible contact of the soft tissue of the retro-molar pad with a treatment fluid.

To overcome these obstacles, the vacuum seal in the rear of the dental cover layer preferably is made with a molar tooth present on each side of the dental arch, to enable pressing and deforming the rear distal plugs when the patient inserts the upper and lower teeth and surrounding gums into the upper and lower treatment cavities of the mouthpiece and bites down into the distal plugs. The rigid occlusal stop bite resistors prevent the collapse of both the soft body vacuum tube posterior bore holes and the internal vacuum lines of the mouthpiece which directly communicate with both the upper and lower treatment cavities so that when a vacuum force is applied via the vacuum lines they remain open and fluid seal of the mouthpiece is achieved and maintained despite the biting forces applied inside the soft body of the mouthpiece. Although, this may limit the ability to provide a dental treatment to one or more molars, the aforementioned benefits generally outweigh this concern. Nevertheless, the need to form a sufficient seal (e.g., for maintaining a vacuum) may present particular challenges when sealing over a molar. Surprisingly a sufficient seal has been achieved using a unique distal plug feature incorporated into the rear areas of the treatment cavity wells.

To prevent such leakage of the treatment material and to allow for the ability to create and maintain a continuous or selectively sustained vacuum in the mouthpiece, various teachings of the present invention may incorporate one or more distal plug features (i.e., distal sealing plugs). The term "selectively sustained vacuum" may refer to the ability of a user or practitioner to determine how long to maintain the vacuum, initiate and release vacuums multiple times in a treatment etc. Preferably distal plugs are employed at both ends (right and left) of each dental cover layer. The distal plugs may be designed to cover the rear portions of the treatment cavity well of the dental cover layer. Preferably, the distal plugs effectively seal these openings. For example, the distal plugs may seal the openings when the patient bites down into the mouthpiece. In some embodiments, distal plugs of various sizes (e.g., heights and lengths) may be integrated into the design of the mouthpiece.

Each dental arch mouthpiece device includes one or more treatment supply layers. The treatment supply layer may provide one or more treatment fluids to a dental cover layer, may provide heat to a dental cover layer, or both. If the mouthpiece includes two dental cover layers, each dental cover layer may have a separate treatment supply layer, or a single treatment supply layer may be employed for both dental cover layers. For example, a single treatment supply layer may be positioned between two dental cover layers. The treatment supply layer may contain built-in flow channels or tubes capable of flowing one or more treatment fluids. The flow channel or tubes of treatment supply layer preferably course throughout this layer of the mouthpiece. The treatment supply layer preferably has one or more (e.g., two or more) inlet holes for delivering a fluid to a well (e.g., sealed cavity) of a dental cover layer. The treatment supply layer preferably has one or more (e.g., two or more) outlet holes for removing a fluid from a well (e.g., sealed cavity) of a dental cover layer. It will be appreciated that flow directions may be changed so that an outlet hole can function as an inlet hole, so that an inlet hole can function as an outlet hole or both. A treatment supply layer that services upper and lower dental cover layers may have (1) one or more holes (e.g., inlet and outlet holes) in the floor of the treatment supply layer for providing a fluid communication with the treatment cavity or well of the dental cover layer of the lower teeth and surrounding gums; and (2) one or more holes (e.g., inlet and outlet holes) in the ceiling of the treatment supply layer for providing a fluid communication with the dental cover layer over the upper teeth and surrounding gums. The flow channels or tubes preferably transport and substantially evenly distributes one or more treatment fluids to the dental cover layer. The treatment fluid may be any art known treatment fluids, such as described herein. For example, the treatment fluid may include a whitening material (such as a gel material), water, air, medicinal materials, therapeutic materials, cleansing materials, rinsing materials, or any combination thereof. The treatment supply layer may deliver one or any combination of the treatment fluids into the treatment cavity wells (e.g., the dental arch wells) of the dental cover layer. As such, the treatment supply layer may effectively bathe one or more (e.g., all of the surfaces of the teeth and surrounding gums in the well and covered by dental cover layer(s) with the whitening gel or other treatment materials. Preferably the channels or tubes are capable of delivering and/or removing a plurality of treatment fluids, such as water or air.

The treatment supply layer of the mouthpiece may include a cavity or port for the insertion of a heating module unit for the controlled heating of treatment fluids flowed through the heating module unit and then into the treatment cavities of the mouthpiece. The treatment supply layer may be integrated into a coupling component of the mouthpiece to allow for the secure insertion of the heating module unit into the coupler and the secure fluid connection of the coupler containing a segment of the treatment supply layer of the mouthpiece to the heating module unit.

The soft body of the cover layers of the mouthpiece may be very soft (e.g., VLRH—very low rubber hardness) to promote patient comfort and wear on insertion in the oral cavity. The soft body of the cover layers of the mouthpiece may be very soft so as to promote their easy collapse and closely adapted conformation to the side walls of the gum ridges (upper and lower) so as to expand the number of patients with varying gum ridge anatomy that the mouthpiece roll border rims can be sucked onto to achieve good vacuum fluid seal of the mouthpiece to the gum ridges as well as enhancing the ability to achieve an acceptable level and maintenance of good vacuum fluid seal throughout the treatment even when positive pressure is applied inside the treatment cavities when flowing in treatment materials inside the cover layer treatment cavities.

The soft body may be made from silicone materials or thermoplastic elastomer materials or other elastomeric materials of very low shore hardness.

Rigid or semi-rigid stiffening elements on both the buccal and lingual/palatal aspects of the covers may be incorporated in some embodiments of the mouthpiece. These rigid or semi-rigid elements are designed to resist the collapse of the specific areas of the covers (when a vacuum force is applied to the inside treatment cavities of said covers) which they are attached (externally as an "exoskeleton" or embedded or semi-embedded as an "endoskeleton") to create cover layers (a soft body) that is/are differentially collapsible/conformable to the gum ridge or ridges they cover when inserted into the mouth. This allows for the cover layers to intimately adapt (by readily collapsing and being sucked onto) to the gum ridges at their peripheral roll border rims or apron segments and provide a good vacuum fluid seal of the covers to the sides of the upper and or lower gum ridges whilst those areas of the covers (soft body of the device) to which the rigid stiffening members are attached to resist collapse and maintain a negative space between the teeth and surrounding gums covered by the fluid sealed soft body of the cover layers.

This design of the mouthpiece device of the present invention may allow for significant volumes of treatment materials to be flowed inside the treatment cavities of the soft body of the cover layers (both on the buccal and lingual/palatal aspects of the soft body cover layers) and remain present on the surfaces of the teeth and our surrounding gums covered by cover layers and contained within the treatment cavities when a vacuum force is applied and maintained to the mouthpiece.

The design of the mouthpiece may further allow for treatment material to be flowed into the mouthpiece treatment cavities under positive pressure while maintaining both a fluid seal around the peripheral roll borders of the mouthpiece to the gum ridges and maintaining a robust negative space for the treatment fluids to fully cover the teeth and or surrounding gums throughout the treatment. Alternatively, these rigid or semi-rigid stiffening elements may be partially or fully embedded inside the cover layers (as an "endoskeleton").

Embodiments of the mouthpiece may incorporate upper and or lower "bite plates" inserted into or embedded or semi-embedded into the upper floor and lower ceiling of the soft body cover layers of the upper and lower treatment cavities respectively of the mouthpiece. These may incorporate positioning depressions or ridges to optimally position the teeth and gum ridges inside the mouthpiece and may also be helpful in addition to the occlusal stop bite resistors in preventing the patient from biting down too hard and collapsing and thereby compromising the internal vacuum tube supply layer's lumen integrity and ability to achieve and maintain a vacuum applied fluid seal of the mouthpiece inside the mouth.

Embodiments of the mouthpiece may also incorporate a rigid mouthpiece coupler component that fluidly connects to the soft body cover layers and supply layer/s. This rigid mouthpiece coupler may further allow for its fluid connection to a heating module unit that itself is fluidly connected via a set of tubing to the control unit and a treatment container (or disposable treatment cartridge) that may be inserted into the control unit. The treatment container or disposable cartridge is itself fluidly connected to the tubing and through it to the heating module unit and the connected mouthpiece device's treatment cavities of the present invention.

The mouthpiece coupler is some embodiments may incorporate rigid or semi-rigid vacuum tube extensions (right and left sides) that insert part way into the vacuum tubes of the supply layer (built into the soft body of the mouthpiece) so as to partially protect the lumen integrity of the vacuum tube line when the mouthpiece is inserted into the mouth and the patient closes his upper and lower jaws to insert the upper and lower dentulous or partially dentulous upper and lower gum ridges into the upper and lower cover layer treatment cavity wells.

The mouthpiece coupler may incorporate in some embodiments a rigid or semi-rigid vacuum tube which fluidly connects to the heating module unit and connected control unit tubing (that itself is connected to a vacuum pump/s and a flow control mechanism inside the control unit. This specific vacuum tube may incorporate in some embodiments a deformable o ring feature to enhance the fluid sealing of the mouthpiece coupler to the heating module unit and vacuum tubing line of the control unit.

The components, devices, systems, and process according to the teachings herein may be employed in a dental treatment for providing a treatment to one or more teeth, for providing a treatment to the gums, or both. These components, devices, systems, and processes may find application in teeth whitening; antibiotic treatment, antimicrobial treatment, fluoride treatment, or any combination thereof. It will be appreciated that other applications in the field of dentistry may find use of the features according to the teachings herein. The dental treatment may be a generally short treatment, such as for about 10 minutes or less, or may be a generally long treatment, such as for greater than 10 minutes, preferably about 20 minutes or more, more preferably about 30 minutes or more. It will be appreciated that the duration of the dental treatment will typically be about 3 hours or less, more preferably about 2 hours or less, and most preferably about 1 hour or less. Dental treatments of duration greater than 3 hours are also anticipated (e.g., from about 3 hours to about 8 hours, such as during the night sleep hours). A vacuum may be applied to the dental cover layer for a substantial portion (e.g., at least 50% of the duration, at least 70% of the duration, at least 80% of the duration, or at least 90% of the duration) of the treatment time. The dental cover component surprisingly can maintain a vacuum for such long durations even when the dental cover component is a stock generic cover (i.e., not a custom-made cover).

As mentioned above, according to some embodiments, a dental treatment system may include a pumping component for pumping one or more treatment fluids. For example, the pumping component may be in fluid communication with a mouthpiece according to the teachings herein. Preferably the pumping component is in fluid communication with the treatment supply layer of the mouthpiece. The system may include a control unit for controlling the pumping component. A pumping component may be incorporating into the housing of an external control unit or may be a separate element. The pumping component may incorporate a set of pistons that can compress a collapsible accordion style disposable cartridge or other type of cartridge inserted into the control unit and deliver a controlled volume and flow rate of the treatment materials via the control unit tubing to the connected heating module unit for controlled heating and delivery of the treatment material via the mouthpiece coupler and supply layer of the mouthpiece to the mouthpiece treatment cavities. For example, a control unit including a microprocessor may monitor and/or control the temperature of a treatment fluid. The control of the temperature preferably employs a feedback loop. Using the temperature control, the temperature of a treatment fluid being delivered to the mouthpiece may be controlled. A connected heating module unit may advantageously enable a practitioner to utilize a whitening fluid (e.g., a whitening gel) immediately from storage, and thus eliminate the need for a step of defrosting the whitening fluid, a step of warming the whitening fluid, a step of preparing the whitening fluid for usage in a dental treatment, or any combination thereof. As such, the dental treatment processes according to the teachings herein may be free of combination or all of the aforementioned step. By allowing for the heating of the whitening fluid/gel it is possible to significantly enhance the chemical activity and whitening capacity of the whitening fluid/gel.

The in-flow of the treatment material may allow for the treatment fluid/gel to circulate in the mouthpiece device of the present invention. This flow can be continuous or sporadic (e.g., pulsed or intermittent). For example, when whitening fluid is flowing in a turbulent manner within the sealed treatment cavity formed by the dental cover layer, so that the amount of chemically active treatment fluid that contacts the enamel surfaces of the teeth is greatly increased compared with the case where the treatment fluid is delivered into the mouthpiece and remained statically in place during the whitening treatment. This convection type flow of the treatment fluid around all the enamel surfaces of the teeth increases the whitening potential of a fixed volume of treatment fluid that is delivered to the mouthpiece. This is exactly analogous to the higher heat flux when heating foods in a convection oven. For example, by flowing treatment fluid contained in the mouthpiece device around the teeth in a turbulent manner (just as hot air flows in a convection oven), the system increases significantly the volume of chemically active whitening fluid, delivered to the mouthpiece, that can come in contact with all the enamel surfaces of the teeth. Increased volume of chemically active whitening fluid in contact with all enamel surfaces of the teeth results in significantly increased whitening effect of the fluid into all these enamel surfaces of the teeth.

As mentioned above, the flow of the treatment fluid may employ a pump component, such as pump component controlled by a microprocessor, in a sporadic or pulsing manner for a given interval of time. This may allow for alternate static or convection flow of the treatment materials (around the teeth) for set periods of time in the mouthpiece device.

The systems and methods may employ one or more pressure sensors for measuring a pressure in a tube, for measuring a pressure in a sealed cavity, for measuring a pressure in a layer of the mouthpiece (e.g., the treatment supply layer, and/or the dental cover layer), or any combination thereof. The pressure sensor(s) may be incorporated into the control unit and or the heating module unit fluidly connected to the mouthpiece. Pressure sensor(s) may monitor, for example, the degree of vacuum in the mouthpiece, one or more flow rates, the total amount of treatment materials delivered into, or alternately, removed from the mouthpiece device by the pump, or any combination thereof. A sensor may also monitor the flow rate of a treatment fluid during a "closed-circuit" treatment cycle. In some embodiments a magnet may be used to verify proper closure of a handle/coupling mechanism (incorporated into the mouthpiece coupler) of the mouthpiece coupler and the attached heating module unit and control unit tubing set. For example, the heating module unit may include an electromagnetic sensor to determine when the parts (e.g. heating module unit and mouthpiece coupler component) are properly connected, or not.

By maintaining a vacuum seal of the dental cover layer of the dental mouthpiece to the gum ridges, the peroxidase enzymes naturally found in saliva are substantially or even entirely prevented from seeping into or otherwise penetrating the sealed cavity. This novel vacuum sealing feature of the present invention may effectively protect the chemically active treatment fluids, such as whitening gel, from being chemically deactivated by the salivary enzyme peroxidase. As the treatment fluid's chemical oxidative potential is never substantially compromised by the saliva, the whitening result of the present invention is enhanced. Additionally, as saliva is always present in the mouth, the effective vacuum fluid seal of the mouthpiece to the gum ridges reduces or entirely prevents saliva from entering into the treatment cavities and diluting the concentration of the treatment materials thereby enhancing the efficacy of the undiluted treatment material whilst it remains in the treatment cavities and in contact with the target tissue (hard or soft or both).

It will further be appreciated that a pumping component may allow for continuous flow of a treatment fluid into and out of the mouthpiece throughout the treatment. As such, fresh new fluid having full chemically activity may be delivered and applied to some or all the enamel surfaces of the teeth contained within the dental cover layer throughout the treatment. When employed in a whitening treatment, this may significantly increase the whitening result that can be obtained in a set period of time of the present invention compared to a static one-time delivery of treatment materials as is the case in known tooth whitening procedures.

According to some embodiments, flexible tubes may be connected to the pumping component from the fresh and spent treatment fluid containers and a separate set of flexible tubes connected to the plumping component which in turn also connect to separate inflow and outflow tubes integrated into the front of the mouthpiece. These inflow and outflow tubes may be further integrated to fluidly connect with a heating module unit which is in turn fluidly connected to an integral handle design (mouthpiece coupler) of the mouthpiece device.

The set of tubes from the pump assembly of the control unit to the mouthpiece device may be clipped via a clasping device or small harness to the patient's clothing, patient dental apron, or some element of a dental chair or other fixing point so that any drag they create on the mouthpiece is reduced or eliminated, so that the tube or set of tubes are neatly organized, or both.

The tubes may consist of a multi-lumen segmented tube containing separate tube lines for treatment material in-flow, vacuum line tube used for initiating and maintaining vacuum in the mouthpiece and for sucking out spent treatment material from the mouthpiece to a waste container in the control unit, separate tubing for flowing water either from a water reservoir in the control unit or from the water line of a dental chair unit or other accessible water source, an air intake line for flowing air into the mouthpiece, a power cable, and sensor and lighting cables.

Another aspect of the invention is directed at a separate disposable self-gripping elastomeric gum protector or barrier component, in cases where the gums covered by the cover layers of the mouthpiece require additional protection from treatment materials. The gum protector component may be used with a dental treatment fluid and the mouthpiece of the present invention fitted over it. The gum protector component may be employed in a process of treating teeth with one or more fluids/gels for whitening teeth. The gum protector component may provide a sufficient barrier for the gums covered by the inserted mouthpiece so that highly active treatment fluids may be employed and flowed into and out of the treatment cavities of the mouthpiece. The gum protector component may be designed for insertion onto each separately of the gum ridge(s) of the upper jaw, the lower jaw, or both. The gum protector component preferably is inserted into the oral cavity prior to the insertion of the mouthpiece into the oral cavity when using treatment materials that could damage the gum tissue sitting inside the treatment cavities of the mouthpiece. For example, the gum protectors/guards/barriers may act to isolate both the maxillary and mandibular gum tissues that are covered by the mouthpiece from even highly concentrated hydrogen peroxide whitening gels that will be delivered into the treatment cavity well(s) of the cover layers of the mouthpiece device, or other potentially harmful treatment materials. The gum protector component may sufficiently cover and fluidly seal the gums whilst leaving the erupted portions of the teeth substantially exposed so peroxide having a concentration of about 15% or more, about 25% or more, about 35% or more, or about 45% or more can be used to whiten the teeth without harming the gum tissue exposed inside the mouthpiece treatment cavities to these concentrations of peroxide.

The gum protector component may be provided as a kit including a plurality of different size gum protector components. The gum protector component may be sufficiently pliable so that only a few different sized stock generic gum protector components are required to treat the majority of patients. For example, the kit may include gum protector components having about 2 or more different stock generic sizes, preferably about 3 or more different sizes, and more preferably about 4 or more different sizes. The number of different stock generic sizes preferably is about 10 or less. The disposable gum guard also may come with different sized tooth holes or a variable number of tooth holes (e.g. patients who have had all four bicuspids extracted as part of their orthodontic treatment).

The separate and disposable self-gripping gum protector barrier (i.e., gum protector component, or gum guard component) in one of its embodiments may be comprised of a stretchable polymeric material. Preferred polymeric materials have an elongation at break of about 100% or more, more preferably about 200% or more, and most preferably about 300% or more. Preferred polymeric materials have a sufficiently low tension set so that the material recovers its initial shape after being stretched. For example, the tension set (measured at room temperature, 10 minutes after stretching the material by 200%) may be about 10% or less, preferably about 7% or less, more preferably about 5% or less, and most preferably about 3% or less. The polymeric material may have a carbon containing backbone or a silicon containing backbone. The polymeric material may be an elastomer. Examples of elastomers that may be employed include silicone elastomers and specifically liquid silicone rubber (LSR) or high consistency rubber (HCR) silicones, natural rubber/latex materials, poly-isoprene, styrene butadiene rubber; SEBS rubbers, or any combination thereof. The gum protector component may have a chemical coating or layer that has been applied and fixed to one or more of its surfaces. For example, a layer may be applied to the inner (proximal) surfaces of the gum protector component, so that the layer is in contact with the gum tissues. The material preferably combines the mechanical properties of high tear strength with low modulus of Young (low recoil force).

Each of the silicone and or rubber body of the gum protector/guards may be pre-shaped to mirror the horse-shoe arch shape and the three-dimensional ridge form of the gum ridges of each of the upper and lower jaws so as to adapt quite closely to these oral structures.

The body of the gum protector/guard component may be further modified to allow for multiple teeth hole cut-outs of varying diameters and varying spacing between them (fully cut out or perforated for selective removal) along the section of said guard which mirrors the location of the center ridge lines of the gum ridges and the teeth of the upper and lower jaws. These cut-outs may mirror or conform in their shape to the scalloped form/shape of the gum-line (inter-dental papilla) of the teeth to be treated.

The body of the gum guards may incorporate inside them multiple hollow tunnels on both their buccal and lingual/palatal aspects that may be pre-filled with various light curable polymer resin materials.

The inner coating of the gum protector/guard component (facing the gum ridges), as noted above may contain various chemical compounds such as a sugar-based gel or spray-on self-adhering coating whose purpose is to provide a chemical neutralization of the active treatment materials, for example peroxide based whitening gel, and so act as a chemical barrier to further protect the gum tissues from the treatment materials. As mentioned above, the gum protector/guard may provide an effective barrier to protect the gums tissues from even very high concentrations of treatment materials, such as, for example, hydrogen peroxide whitening gels of 35% or even higher.

The optionally disposable self-gripping gum protector/guard component described above may provide a flexible yet snugly fitting barrier to the gums and alveolar gum ridges that can be placed over and through the erupted portions of the teeth and then seated onto the gum ridge to be treated. When positioned in a dental arch in the mouth and fully seated on the gum ridge, the crowns of the teeth may protrude out of the gum protector component while covering the gums. This fitted self-gripping barrier (the disposable gum protector/guard component) is further shaped to also allow for a good fit and seal of the single or double dental arch mouthpiece device's deformable peripheral roll border rims (especially when a vacuum force is applied to the mouthpiece) to the both the upper and lower gum protector/guards. This allows for a good seal of the treatment fluid that is delivered into the mouthpiece device and prevents leakage of the treatment materials from between the mouthpiece device and its fluid sealed adherence to the underlying gum guard from the oral cavity (while the gum guard protects the gums/gum ridge).

When the self-gripping gum protector component is used with a dental treatment layer, the seal of the space around a row of teeth may be further enhanced by the unique deformable flap apron design and peripheral border roll rims of the dental cover layer/s of the mouthpiece. This seal in conjunction with the unique distal sealing plugs, may enhance the ability of the pump to suck out the air from the mouthpiece and create an effective vacuum fluid seal of the dental cover layer/s to the outer side wall surfaces of the previously placed gum protector components. It will be appreciated that an upper and a lower gum protector component may be employed for protecting each of the upper and lower jaw's gum ridges from caustic treatment materials flowed into the treatment cavities of the mouthpiece of the present invention.

This configuration and relation of these components to each other in the oral cavity effectively and safely isolates the various concentrations of whitening agents applied to the teeth from the soil tissues (gums, tongue, cheeks, palate, oral mucosa) and so may protect these soft tissues from the caustic effects of even highly concentrated formulations of these chemical agents during for example, the improved whitening treatment of the present invention.

As mentioned above, other embodiments of the disposable self-gripping gum protector may also include an inner coating which is self-adhering coating when placed in contact the gum tissues. These coatings may include various medicaments or chemical compounds for therapeutic delivery of these various medicaments or compounds to the gum tissues. Further embodiments of the disposable gum protector/guard have wider dental and medical applications wherever what is known in the dental field as a "dry field" is required or advantageous for a given medical/dental procedure. Said gum protector/guard can be utilized in many dental procedures as a replacement for what is commonly known in the dental field as rubber dam. It can also be used to create an effective barrier against saliva dilution or "washout" of medicaments or other treatment materials placed on the gum tissue or syringed into the gum "pockets" (sulcus) and then covered by the pre-formed three-dimensional gum barrier.

The self-gripping gum guard barrier can be made of elastomeric materials that are fluid impermeable yet gas permeable to allow for their placement for extended periods of time on the gum ridges. This allows for an extended exposure time for the medicaments or treatment materials on or in the gum tissue without any dilution of said materials or medicaments whilst allowing the gum tissue covered by the gum drape to "breathe" the entire time the barrier is applied and cover the gum ridge.

Additionally, as the disposable self-gripping gum protector/guard component is not integral to the appliance, it may be provided in several stock sizes to match a given stock sized mouthpiece device and so provide, without the need to customize the mouthpiece or gum protector guard for each patient, an effective isolation of the gums and other soft tissues of the mouth from even highly concentrated formulations of treatment materials without the need to manually apply a hardening foam material as is in common use in the current professionally administered power whitening procedures.

In accordance with some embodiments, an optional tooth shade matching sensor unit may be incorporated into the control unit, which may be used to record pre- and/or post-treatment tooth shade values.

Another aspect of the invention is directed at a kit including a plurality of mouthpieces, such as a plurality of mouthpieces according to the teachings herein. The kit preferably includes stock generic (i.e., not custom made) mouthpieces and includes mouthpieces having different sizes. The kit may include mouthpieces having different widths for matching with mouths having different widths of the dental arch (e.g., as measured between corresponding left and right molars). The kit may include mouthpieces having different length of arches. It will be appreciated according to the teachings herein that the use of distal sealing plugs may reduce or eliminate the need for mouthpieces having different lengths. By employing a kit of stock generic mouthpieces, the need for custom production of a mouthpiece (e.g., using a dental mold impression) may be eliminated. The kit may include pre-assembled mouthpieces or may include stock generic dental cover layers, such as the dental cover layers according to the teachings herein. The kit may include dental cover layers suitable for lower dental arches, suitable for upper dental arches, or both. The kit preferably includes dental cover layers having different widths use in individuals having dental arches with different widths. The kit may include one or more treatment supply layers, such as a treatment supply layer according to the teachings herein. The treatment supply layer may be suitable for connecting with one or two dental cover layers. The need for dental cover layers having different lengths may be reduced or eliminated by employing distal sealing plugs in the dental cover layer suitable for sealing the rear ends of the dental arch. Preferred kits include mouthpieces and/or dental cover layers having two or more different stock generic sizes, more preferably three or more different stock generic sizes, and most preferably four or more different stock generic sizes. The number of different sizes may be generally large, but preferably is about 20 or more, more preferably about 10 or less, and most preferably about 6 or less or even 4 or less.

In a further embodiment, a method for executing a tooth whitening treatment is provided, wherein one or more of the following steps may be executed: configuring a procedure for simultaneous customized tooth whitening; setting up a pump module to connect to a mouthpiece designed for a teeth whitening treatment; configuring treatment settings on a control device coupled to the pump module; positioning the mouthpiece in a patient's mouth; applying a flow control to cause a vacuum between the mouthpiece and the patient's gum ridge anatomy; applying flow control to automatically manage delivery of materials in accordance with the treatment settings; and using flow control to remove treatment materials from the mouthpiece. Of course, other steps or combinations of steps may be used. For example, prior to a treatment, the baseline shades of the respective teeth may be measured, to enable customized treatment of the respective teeth. In some cases, a gum guard may be used in addition to the mouthpiece and placed on the gum ridges prior to the insertion of the mouthpiece into the mouth and onto the gum guard protected gum ridges and associated teeth. In additional cases, treatment materials may be heated as may be necessary during treatments.

Reference is now made to the respective figures, which describe elements or aspects of multiple embodiments of the present invention. The drawings are provided for illustrative purposes only and are not meant to be limiting.

FIG. 1a is a side view of one embodiment of the mouthpiece 1 of the present invention comprised of four main components; namely a soft body 2, functioning as a mouthpiece to be placed in the mouth to facilitate a dental treatment that is made of elastomeric materials such as silicone or thermoplastic elastomers, and a mouthpiece coupler 3 made of hard plastic materials, functioning as a fluid sealed conduit to transfer treatment materials into the mouthpiece, extract materials from the mouthpiece, act as a handle for the mouthpiece, and function to accept the insertion of treatment material heater (e.g., heating module unit). Also illustrated is a buccal stiffening element 4 and lingual/palatal stiffening element 5, which are hardened exo-skeletal type elements that are designed to act to restrain selected areas of the soft body 2 of the mouthpiece 1, which they are connected to the soft body 2, prevent collapse of the soft body areas they are connected to when a vacuum force is applied to the upper 23 and lower 24 treatment cavities of the mouthpiece 1. These stiffened areas of the soft body, in some embodiments, correspond to the areas of the mouthpiece 1 which cover the upper and lower teeth and surrounding gums contained within the mouthpiece 1. The stiffening of these areas acts to preserve an empty space around the teeth and surrounding gums in both the upper and lower treatment cavities 23 and 24 respectively, when the vacuum force is applied to the mouthpiece 1. The buccal stiffening element 4 provides this stiffening of the soft body on the right and left buccal aspects of the soft body 2, and the stiffening element 5 provides the same stiffening of the soft body on the right and left lingual/palatal aspects of the soft body 2. Further depicted are peripheral buccal upper roll border rims 6, and peripheral palatal roll border rims 7, the upper treatment cavity 23, the coupler heating module vacuum tube 3b for vacuum fluid connection to the heating module unit 30 (not depicted) and the coupler magnet hole 3g.

According to further embodiments, the buccal stiffening element 4 and/or the lingual/palatal stiffening element 5, or other hardening elements, may be endo-skeletal type elements that are embedded inside the soft body 2, and designed to act internally to restrain selected areas of the mouthpiece 1, which they are connected to, to prevent collapse of the soft body areas they are connected to when a vacuum force is applied to the upper 23 and lower 24 treatment cavities of the mouthpiece 1. For example, all endo-skeleton type stiffening elements may be molded and then over-molded with the soft body 2, thereby providing selective or differential collapsibility of the soft body 2 when applying a vacuum to the mouthpiece 1.

FIG. 1b is a front view of the mouthpiece 1 of FIG. 1a wherein are illustrated the soft body upper section 2a, the soft body middle section 2b and the soft body lower section 2c. Also depicted is a buccal stiffening element 4, a treatment material port 10 of the soft body 2, treatment port upper holes 11a and treatment port lower holes 11b which lead the upper 23 and lower 24 treatment cavities respectively, the soft body upper frenum notch 12a, the soft body lower frenum notch 12b, and the coupler heating module vacuum tube hole 3e of the mouthpiece coupler 3.

FIG. 2a is a top/front view of FIG. 1a wherein is depicted the soft body upper frenum notch 12a, parts of the soft body vacuum tube posterior bore hole 16 into which will be inserted a rigid right 31 or left 32 occlusal stop bite resistor (not depicted), for collection of treatment related fluids from the upper 23 and/or lower 24 treatment cavities, and which are connected to the soft body vacuum tube 17 located in the middle portion 2b of the mouthpiece 1, to facilitate vacuum and/or drainage functionality to remove treatment related materials from the mouthpiece 1. Also depicted is an upper bite plate 25 and upper soft body rear vacuum plugs 21a, which are located in the upper soft body rear section 2e, which allow for a posterior vacuum fluid seal of the mouthpiece 1 when the patient has closed his upper posterior teeth into them.

FIG. 2b is a top/rear view of FIG. 1a wherein is depicted the buccal upper roll border 6 and palatal roll border 7 of the soft body upper section 2a, as well as embodiments of upper soft body anterior holes 13a for the inflow of treatment materials into the upper treatment cavity 23 on both buccal and palatal sides of the anterior upper teeth when the mouthpiece 1 is inserted into the oral cavity. Also depicted are the upper soft body rear vacuum plugs 21a, and embodiments of the soft body breathing passages 22 which allow the patient to breathe through their mouth whilst the mouthpiece 1 is fully inserted into the oral cavity.

Figure 3A:
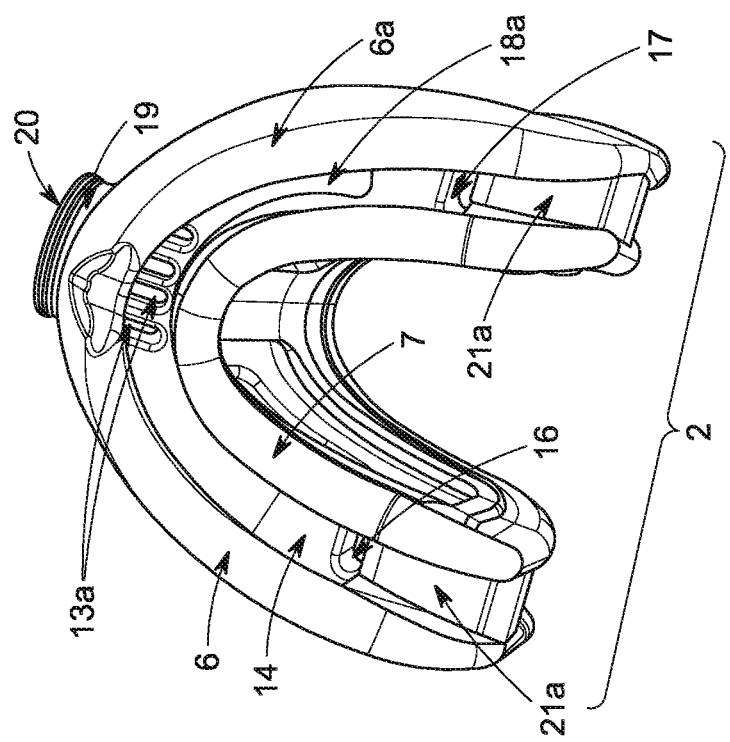
FIG. 3a is an angled top view of the soft body 2 of FIG. 1a, according to some embodiments.

FIG. 3a is an angled top view of the soft body 2 of FIG. 1a, wherein are depicted buccal upper roll borders 6 and the palatal roll borders 7 which, when a vacuum force is applied to the upper treatment cavity 23, readily collapse and adapt to the particular anatomical shape of each patient's maxillary gum ridge, to provide a fluid vacuum seal within the upper portion 2a of the mouthpiece 1. Also depicted are embodiments of the buccal upper roll border outer lip 6a, the buccal upper roll border inner lip 6b, the upper soft body anterior holes 13a, the upper treatment cavity floor 14, the soft body vacuum tube posterior bore hole 16, the soft body vacuum tube 17 into which is inserted either the rigid a right 31e or left 32e occlusal stop bite resistor vacuum line tube of the right 31 of left 32 occlusal stop bite resistors (not depicted) embedded in the middle portion 2b and runs between the upper floor 14 and lower ceiling 15 of the upper 23 and lower 24 treatment cavities, and the upper soft body rear vacuum plugs 21a. Further depicted are embodiments of the soft body extension ring 19 and the soft body extension ring sealing lip 20.

FIG. 3b is an angled bottom view of the soft body 2 of FIG. 1a, wherein are depicted embodiments of the buccal lower roll borders 8 and the lingual lower roll borders 9 which when a vacuum force is applied to the lower treatment cavity 24 readily collapse and adapt to the particular anatomical shape of each patient's mandibular gum ridge to provide a fluid vacuum seal within lower portion 2c of the mouthpiece 1. Also depicted are embodiments of the buccal lower roll border outer lips 6a, the buccal lower roll border inner lips 6b, the lower soft body anterior holes 13b, the lower treatment cavity floor 15, and the lower soft body rear vacuum plugs 21b located in the lower soft body posterior section 2g which allow for a posterior vacuum fluid seal of the mouthpiece 1, when the patient closes his/her lower posterior teeth into them. Further depicted are embodiments of the soft body extension ring 19 and the soft body extension ring sealing lip 20.

Figure 4B:
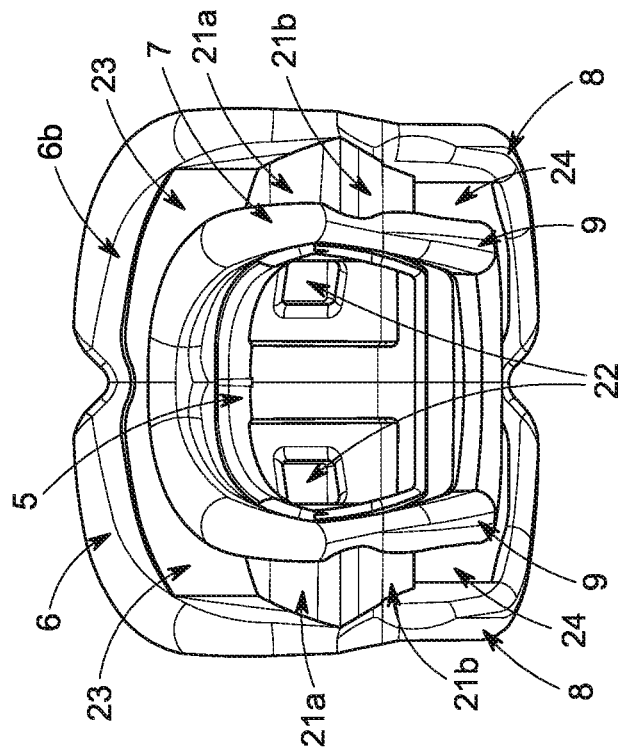
FIG. 4b is a rear view of the mouthpiece 1 of FIG. 1a, according to some embodiments.
Figure 4A:
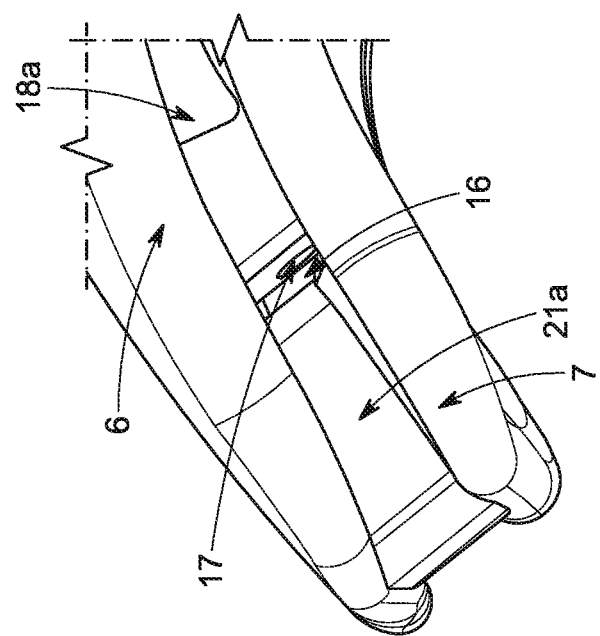
FIG. 4a is a top close-up view of the rear left portion of FIG. 1a, according to some embodiments.

FIG. 4a is a top close-up view of the rear left portion of FIG. 1a wherein are depicted embodiments of the buccal upper roll border 6, the palatal roll border 7, the soft body vacuum tube posterior bore hole 16 where treatment material that flowed into from both the upper 23 and lower 24 treatment cavities can flow into the soft body posterior vacuum tube port 17. Also depicted is and embodiment of the upper soft body rear vacuum plug 21a.

FIG. 4b is a rear view of the mouthpiece 1 of FIG. 1a wherein are depicted embodiments of the lingual/palatal stiffening element 5, the buccal upper roll borders 6 and the buccal upper roll border inner lips 6b, the palatal upper roll borders 7, the buccal lower roll borders 8, and the lingual lower roll borders 9. Further depicted are the upper 23 and lower 24 treatment cavities, embodiments of the soft body breathing passages 22, and the upper 21a and lower 21b soft body rear vacuum plugs.

FIG. 5a is bottom view of one embodiment of the mouthpiece coupler 3, wherein are depicted embodiments of the coupler soft body vacuum tube 3c which is made of a hard plastic or other hard material and which inserts into the anterior segment of the soft body vacuum tube 17 and the right 31e or left 32e rigid occlusal stop bite resistor vacuum line tube of the right 31 or left 32 occlusal bite resistors (not depicted) which insert into the posterior segment of the soft body vacuum tube 17, so as to reduce the possibility of collapse of the entire soft body vacuum tube when the patient closes his/her teeth onto the upper 14 and lower 15 soft body floors of the mouthpiece 1 and also aids to secure the coupler 3 to the soft body 2 of the mouthpiece 1, a coupler soft body vacuum tube hole 3d, a coupler heating module vacuum tube O-ring 3f, which aids in achieving a fluid seal of the coupler heating module vacuum tube 3b to the heating module unit 30, a coupler vacuum tube reservoir 3j which collects used treatment material that has been sucked through the coupler soft body vacuum tube into the coupler vacuum tube port 3k by the applied vacuum force from a control unit, and then into the coupler heating module vacuum tube 3b. Additionally, depicted is an embodiment of the coupler heating module clip holders 31 of the coupler 3, to which is secured the heating module unit 30 (depicted in FIGS. 8a and 8b).

FIG. 5b is an angled front view of the mouthpiece coupler 3 of FIG. 5a wherein are depicted a coupler heating module vacuum tube 3b, a coupler heating module vacuum tube hole 3e, a coupler heating module vacuum tube O-ring 3f, a coupler magnet housing 3h, and coupler magnet hole 3g for housing a coupler magnet 28 (depicted in FIG. 7), and a coupler heating module port 3*m* for the insertion of the heating module unit 30 into the mouthpiece coupler 3. Additionally, embodiments of the coupler breathing passage holes 3*n* are depicted, which align with the soft body breathing passages 22 of the soft body 2 when the mouthpiece coupler 3 is attached to the soft body 2.

FIG. 5*c* is a rear view of the mouthpiece coupler 3 of FIG. 5*a* wherein are depicted a coupler heating module receptacle 3*a* for gripping the heating module unit 30, coupler soft body vacuum tubes 3*c*, coupler soft body vacuum tube holes 3*d*, coupler breathing passage holes 3*n*, and a coupler magnet hole 3*g*.

In some embodiments, vacuum tubes 3C may be designed with a sufficient length to provide a strengthened structure to prevent closing of the vacuum tube even if a patient bites or applies a large amount of pressure on the soft body elements of the mouthpiece, when mouthpiece coupler 3 is connected to the soft body mouthpiece 2.

In some embodiments, vacuum tubes 3C may be designed to mechanically connect to, and optionally lock onto, soft body mouthpiece 2.

Figure 6B:
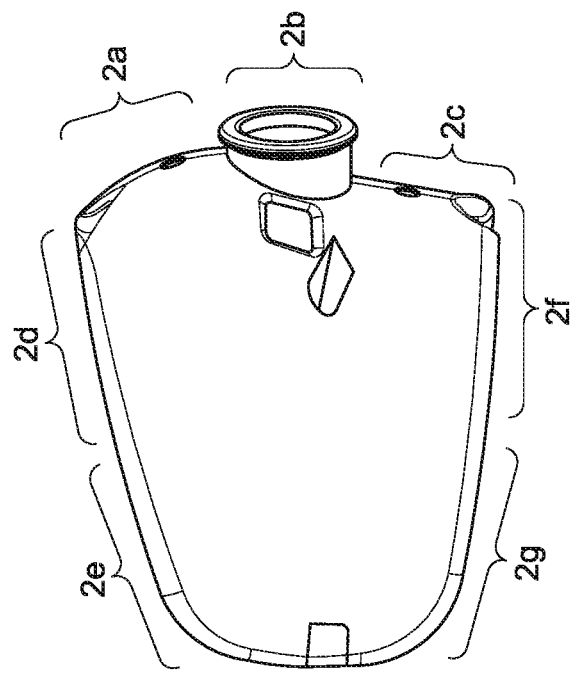
FIG. 6b is a side view of the soft body 2 of FIG. 6a, according to some embodiments.
Figure 6A:
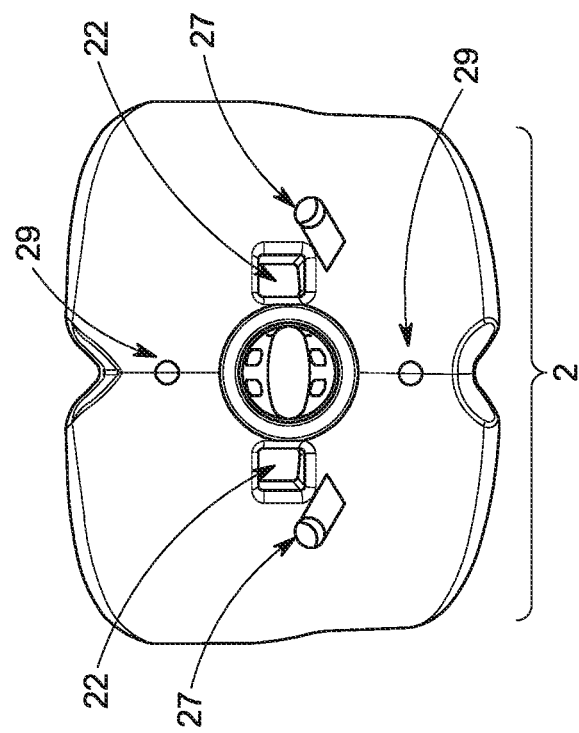
FIG. 6a is a front view of one embodiment of the soft body 2, according to some embodiments.

FIG. 6*a* is a front view of one embodiment of the soft body 2 wherein are depicted embodiments of the soft body breathing passages 22, soft body vacuum tube entry holes 27 for the insertion of the coupler soft body vacuum tubes 3*c* into the soft body 2, and the Soft Body Indexing Depressions 29, for accurately positioning and connecting the mouthpiece coupler 3 with the soft body 2.

FIG. 6*b* is a side view of the soft body 2 of FIG. 6*a* wherein are depicted the soft body upper section 2*a*, the soft body middle section 2*b*, the soft body lower section 2*c*, the soft body upper anterior section 2*d*, the soft body upper posterior section 2*e*, the soft body lower anterior section 2*f*, and the soft body lower posterior section 2*g*.

Figure 7:
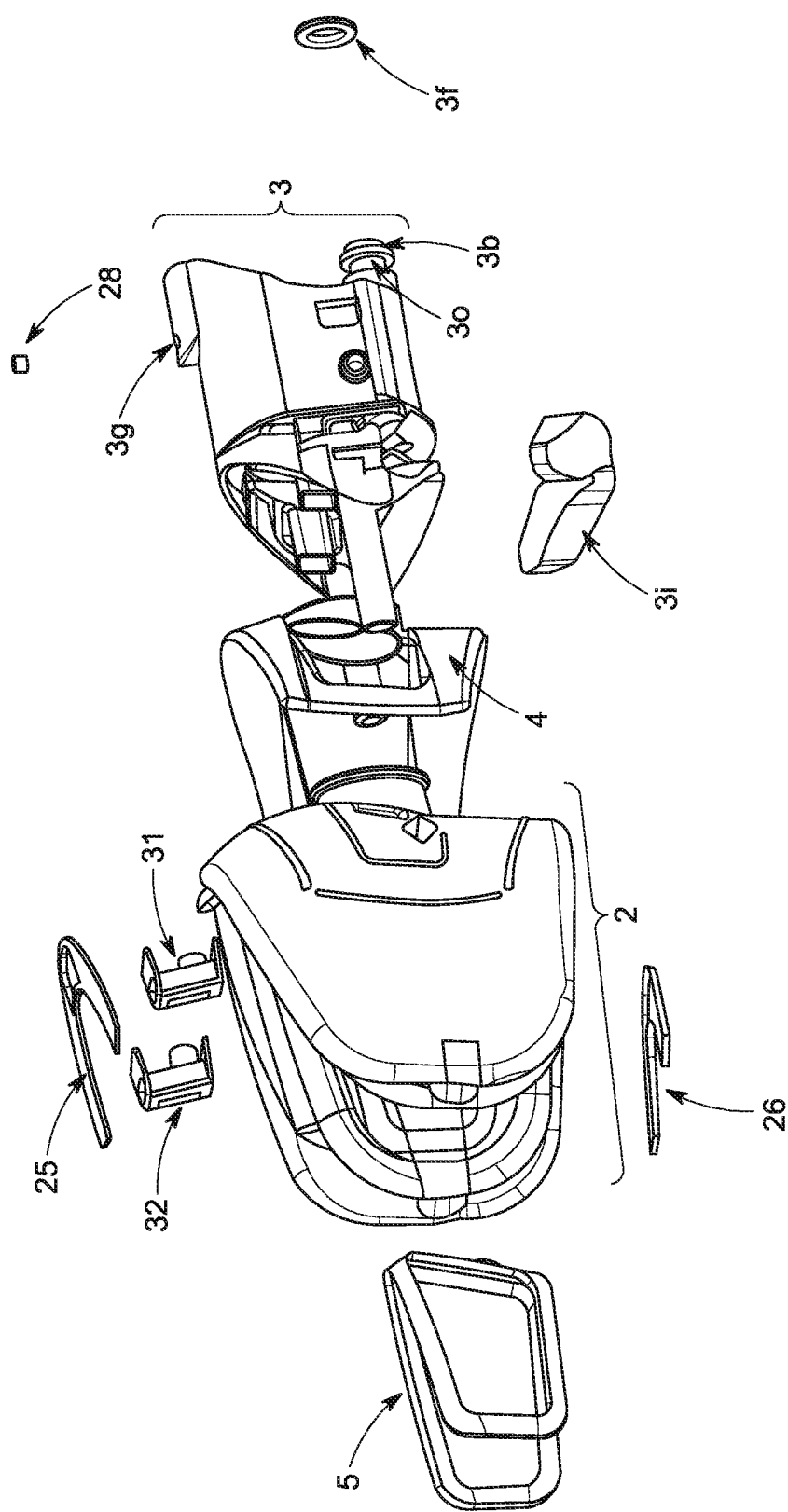
FIG. 7 is an exploded side view of embodiments of the components of the mouthpiece 1, according to some embodiments.

FIG. 7 is an exploded side view of embodiments of the components of the mouthpiece 1 wherein are depicted the soft body 2, the buccal stiffening element 4, and lingual stiffening element 5, the mouth piece coupler 3, and coupler vacuum tube O-ring notch 3*o*, which houses the coupler heating module vacuum tube O-ring 3*f*, and the coupler vacuum tube reservoir plug 3*i*, which fluidly seals the coupler vacuum tube reservoir 3*j*. Further depicted are the right side occlusal stop bite resistor 31, the left side occlusal stop bite resistor 32, the upper bite plate 25 and lower bite plate 26 where all of the above are constructed of hardened plastic or very high shore rubber/elastomeric materials for positioning and creating a rest stop for the upper and lower teeth respectively, and the coupler magnet 28, which verifies electromagnetically a proper connection of the mouthpiece 1 to the heating module unit 30. In accordance with some embodiments, buccal stiffening element 4, lingual/palatal stiffening element 5, and/or other hardening elements, may be embedded or otherwise integrated into soft body 2.

Figure 8A:
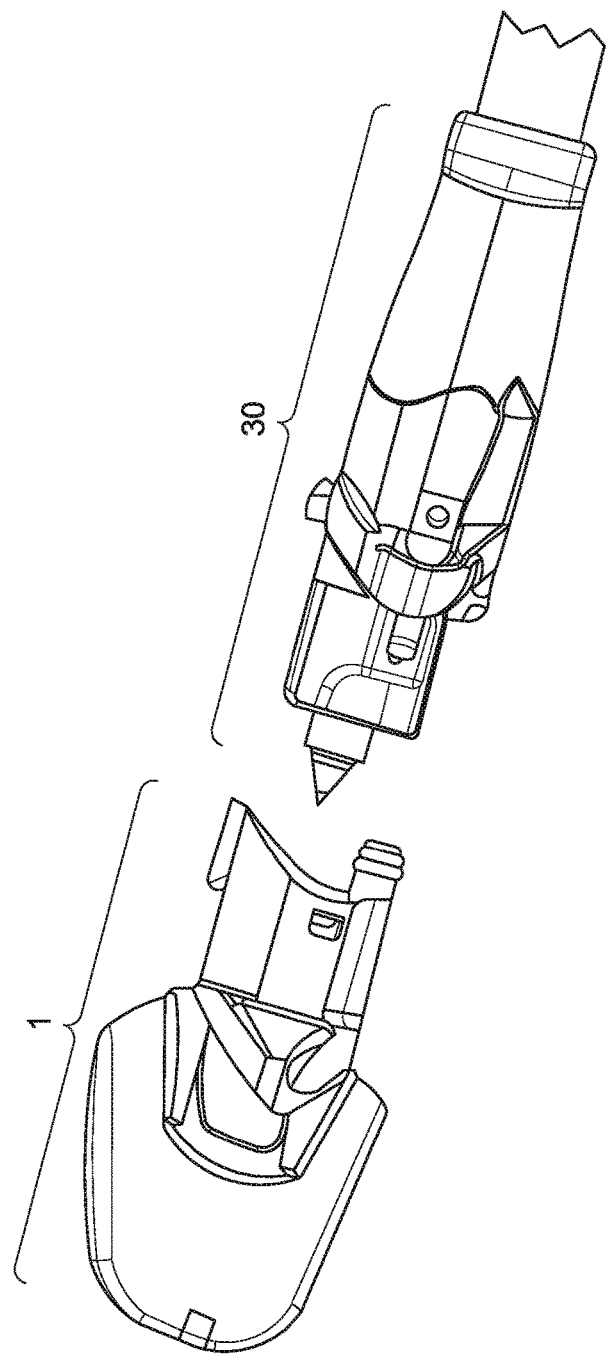
FIG. 8a is a side view of embodiments of the mouthpiece 1 and the heating module unit 30, according to some embodiments.

FIG. 8*a* is a side view of embodiments of the mouthpiece 1, wherein the mouthpiece is coupled to the mouthpiece coupler 3, and is viewed adjacent to a heating module unit (HMU) 30, which is designed to heat up treatment and/or cleaning materials flowing into the mouthpiece and act as a conduit to the connected tube set for in-flow into the mouthpiece from the control unit treatment cartridge and vacuum line out-flow to the control unit waste container (not depicted).

Figure 8B:
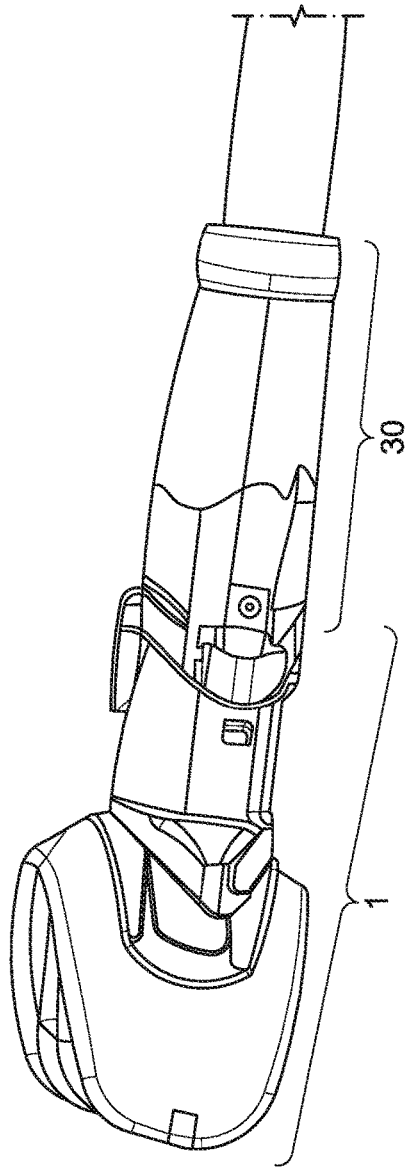
FIG. 8b is a side view of embodiments of the mouthpiece 1 connected to the heating module unit 30, according to some embodiments.

FIG. 8*b* is a side view of embodiments of the mouthpiece 1, wherein the mouthpiece soft body 2 is coupled to the mouthpiece coupler 3 and is connected to the HMU 30.

Figure 9B:
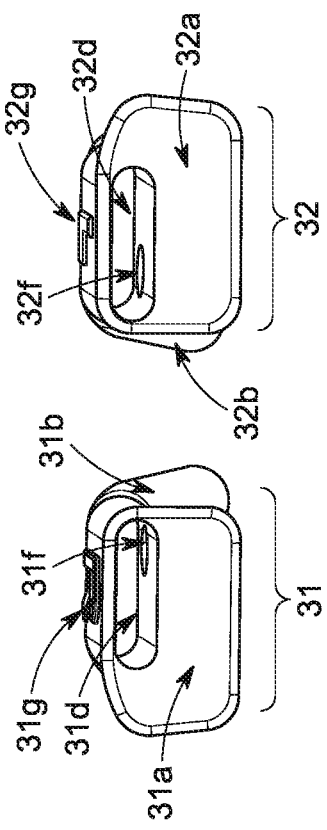
FIG. 9b is a top view of Right side 31 and Left side 32 occlusal stop bite resistors, according to some embodiments of the present invention.
Figure 9A:
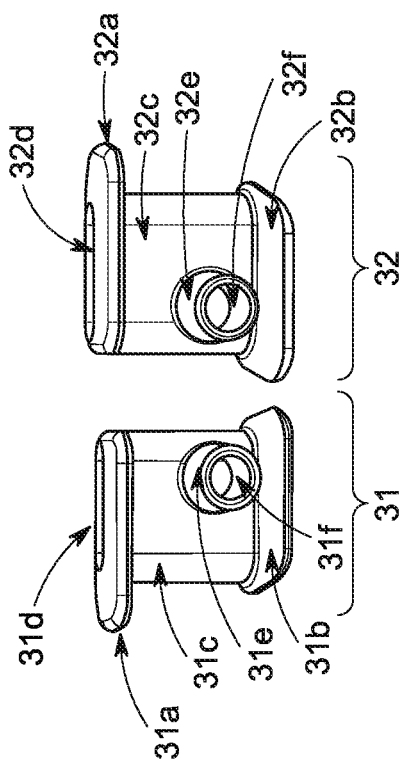
FIG. 9a is a front view of Right side 31 and Left side 32 occlusal stop bite resistors, according to some embodiments of the present invention.

FIG. 9*a* is a front view of one embodiment of a Right side 31 and Left side 32 occlusal stop bite resistor bite stops, according to some embodiments of the present invention, wherein are depicted the Right side occlusal stop bite resistor upper bite plate 31*a* and lower bite plate 31*b* for establishing vertical bite stops for the right side of the maxillary and mandibular teeth, the Right side occlusal stop bite resistor vertical strut 31*c* defining the vertical height disocclusion of the occlusal bite stop 31 with vertical strut channel 31*d* and the Right side occlusal stop bite resistor vacuum line tube 31*e* and vacuum line tube lumen 31*f* allowing for the free flow of air and fluids from the right side of the upper 23 and lower 24 treatment cavities of the mouthpiece 1. Further depicted is the Left side occlusal stop bite resistor upper bite plate 32*a* and lower bite plate 32*b*, the Left side occlusal stop bite resistor vertical strut 32*c* for establishing vertical bite stops for the left side maxillary and mandibular teeth, the Left side occlusal stop bite resistor vertical strut 32*c* defining the vertical height disocclusion of the occlusal bite stop 32 with vertical strut channel 32*d* and the Left side occlusal stop bite resistor vacuum line tube 32*e* and vacuum line tube lumen 32*f* allowing for the free flow of air and fluids from the left side of the upper 23 and lower 24 treatment cavities of the mouthpiece 1.

FIG. 9*b* is a top view of Right side 31 and Left side 32 occlusal stop bite resistors, according to some embodiments of the present invention wherein are depicted the Right side occlusal stop bite resistor upper bite plate 31*a* and the lower bite plate 31*b*, the vertical strut channel 31*d*, the vacuum line tube lumen 31*f* and the vertical strut marker 31*g*. Further depicted are the Left side occlusal stop bite resistor upper bite plate 32*a* and the lower bite plate 32*b*, the vertical strut channel 32*d*, the vacuum line tube lumen 32*f* and the vertical strut marker 32*g*.

Figure 9D:
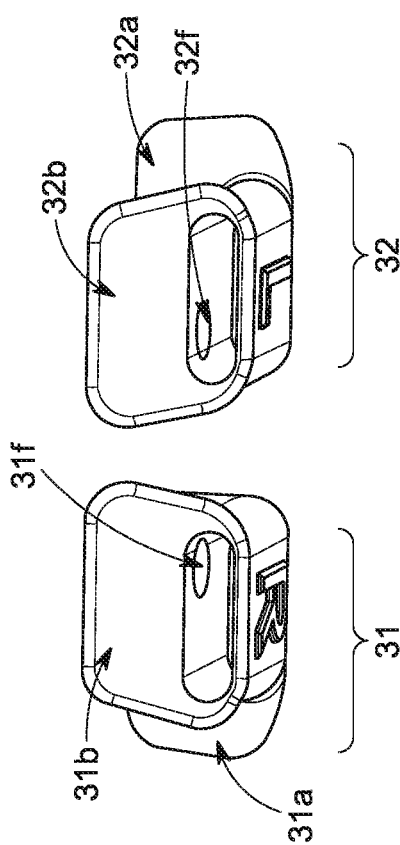
FIG. 9d is a bottom view of Right side 31 and Left side 32 occlusal stop bite resistors, according to some embodiments of the present invention.
Figure 9C:
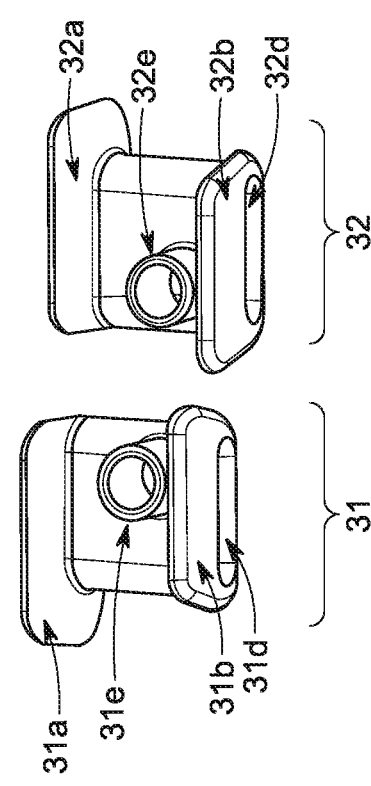
FIG. 9c is a front/bottom, view of Right side 31 and Left side 32 occlusal stop bite resistors, according to some embodiments of the present invention.

FIG. 9*c* is a font/bottom, view of Right side 31 and Left side 32 occlusal stop bite resistors, according to some embodiments of the present invention wherein are depicted the Right side occlusal stop bite resistor upper bite plate 31*a* and the lower bite plate 31*b*, the vertical strut channel 31*d* and the vacuum line tube 31*e*. Further depicted are the Left side occlusal stop bite resistor upper bite plate 32*a* and the lower bite plate 32*b*, the vertical strut channel 32*d* and the vacuum line tube 32*e*.

FIG. 9*d* is a bottom view of Right side 31 and Left side 32 occlusal stop bite resistors, according to some embodiments of the present invention wherein are depicted the Right side occlusal stop bite resistor upper bite plate 31*a* and the lower bite plate 31*b* and the vacuum line tube lumen 31*f*. Further depicted are the Left side occlusal stop bite resistor upper bite plate 32*a* and the lower bite plate 32*b* and the vacuum line tube lumen 32*f*.

Figure 10B:
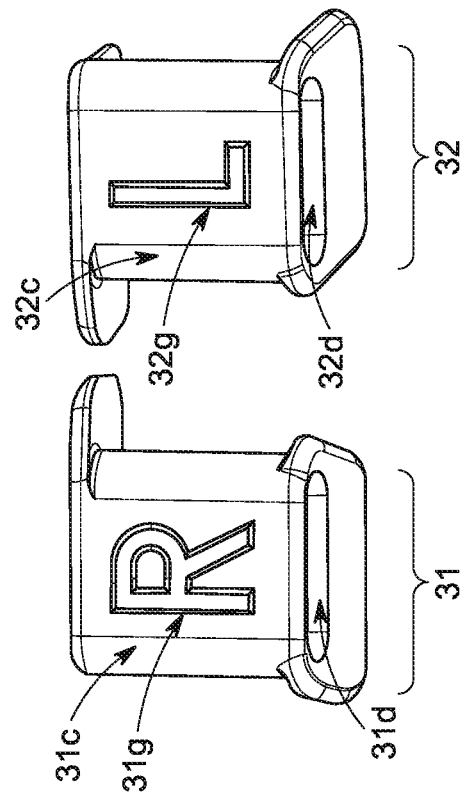
FIG. 10b is a back view of Right side 31 and Left side 32 occlusal stop bite resistors, according to some embodiments of the present invention.
Figure 10A:
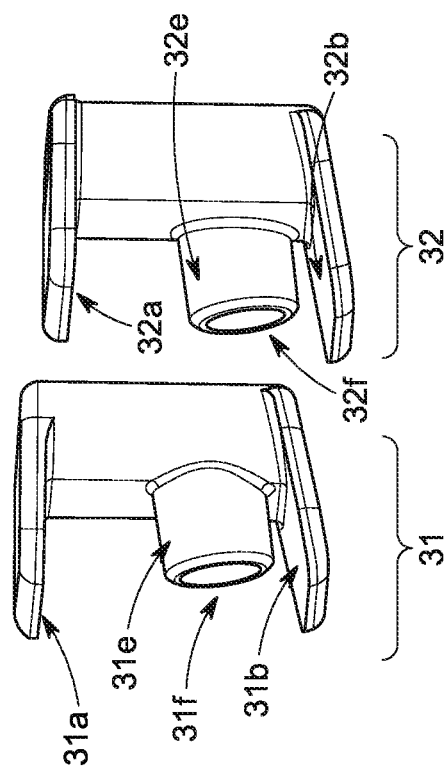
FIG. 10a is a side view of Right side 31 and Left side 32 occlusal stop bite resistors, according to some embodiments of the present invention.

FIG. 10*a* is a side view of Right side 31 and Left side 32 occlusal stop bite resistors, according to some embodiments of the present invention wherein are depicted the Right side occlusal stop bite resistor upper bite plate 31*a* and the lower bite plate 31*b*, the vertical strut channel 31*d* and the vacuum line tube lumen 31*f* of the vacuum line tube 31*e*. Further depicted are the Left side occlusal stop bite resistor upper bite plate 32*a* and the lower bite plate 32*b*, the vertical strut channel 32*d* and the vacuum line tube lumen 32*f* of the vacuum line tube 32*e*.

FIG. 10*b* is a back view of Right side 31 and Left side 32 occlusal stop bite resistors, according to some embodiments of the present invention wherein are depicted the Right side vertical strut channel 31*d* of the Right side vertical strut 31*c* and the Right side vertical strut marker 31*g* of the Right side vertical strut 31*c*. Further depicted are the Left side vertical strut channel 32*d* of the Left side vertical strut 32*c* and the Left side vertical strut marker 32*g* of the Left side vertical strut 32*c*.

Figure 11A:
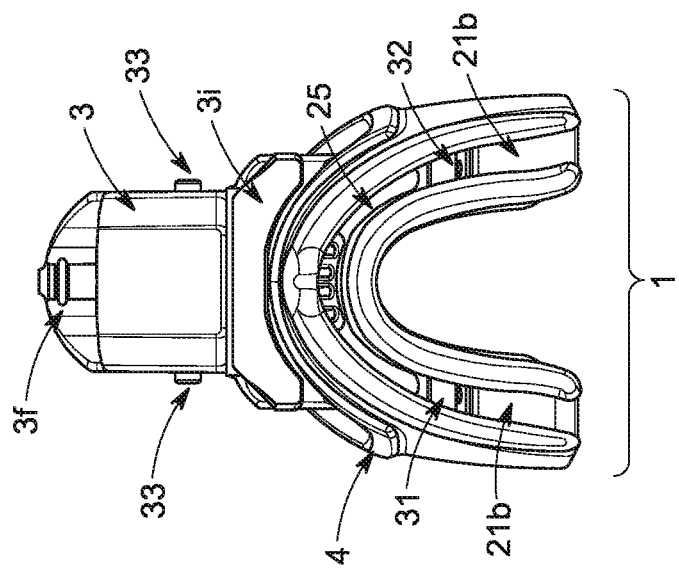
FIG. 11a is a top view of the Right side 31 and Left side 32 occlusal stop bite resistors inserted fully into the mouthpiece 1, according to some embodiments of the present invention.

FIG. 11*a* is a top view of one embodiment of the Right side 31 and Left side 32 occlusal stop bite resistors inserted into the right and left side soft body vacuum tube posterior bore holes 16 and soft body vacuum tubes 17 of the soft body 2 of the mouthpiece 1.

Figure 11B:
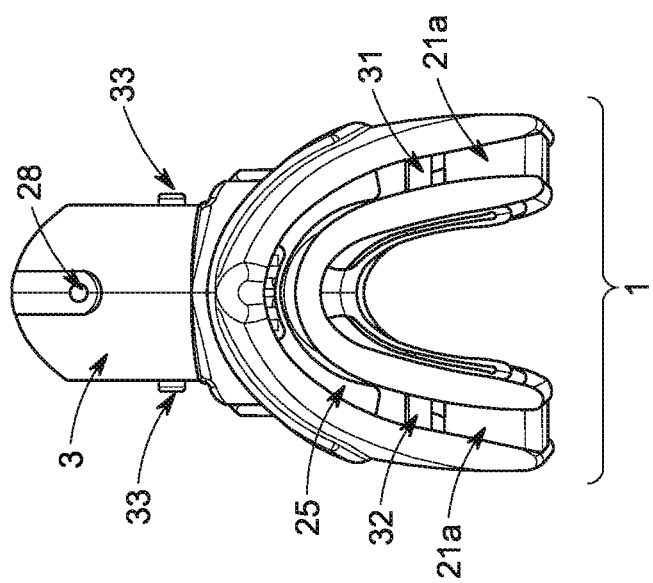
FIG. 11b is a bottom view of the Right side 31 and Left side 32 occlusal stop bite resistors inserted fully into the mouthpiece 1, according to some embodiments of the present invention.

FIG. 11*b* is a bottom view of one embodiment of the Right side 31 and Left side 32 occlusal stop bite resistors inserted respectively into the right and left side soft body vacuum tube posterior bore holes 16 and soft body vacuum tubes 17 of the soft body 2 of the mouthpiece 1.

FIG. 11*c* is an angled side view of one embodiment, in which can be seen the inserted Right side 31 and Left side 32 occlusal stop bite resistors inside a transparent view of the mouthpiece 1.

FIG. 11*d* is a rear view of one embodiment, in which can be seen the inserted Right side 31 and Left side 32 occlusal stop bite resistors inside a transparent view of the mouthpiece 1.

FIG. 11*c* is a bottom view of the inserted Right side 31 and Left side 32 occlusal stop bite resistors inside a transparent view of the mouthpiece 1, according to one embodiment.

Figure 12:
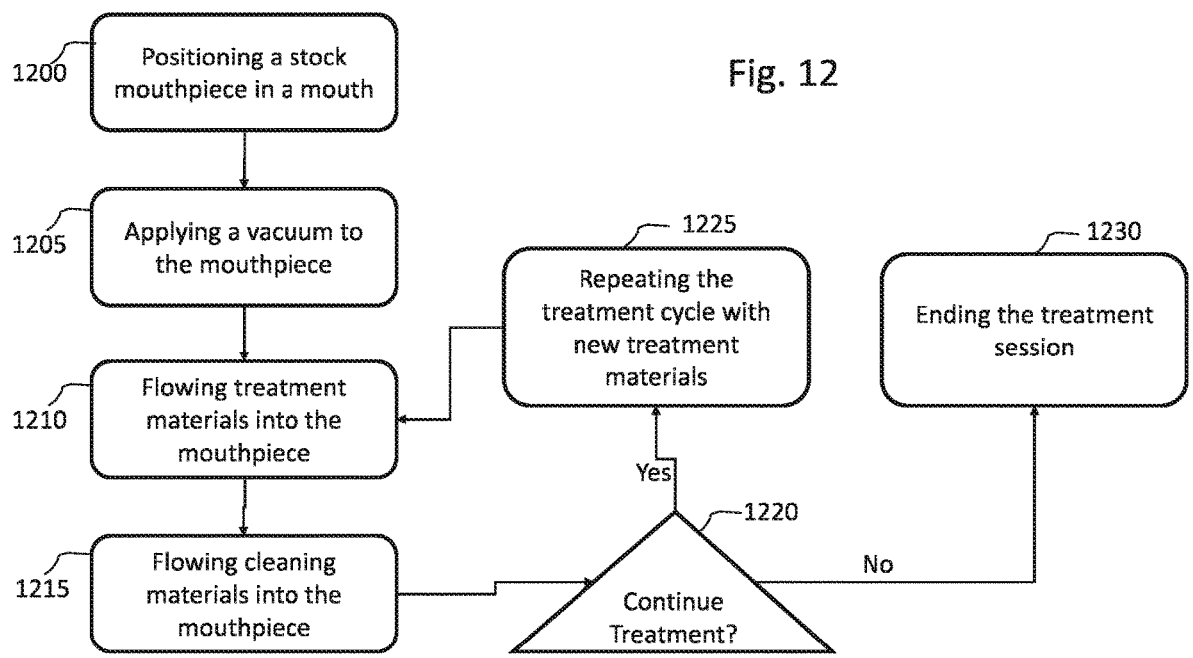
FIG. 12 is a flow chart describing an example of a process of implementing a gum treatment using a mouthpiece and associated components as described herein, according to some embodiments.

FIG. 12 is a flow chart describing an example of a process of implementing a gum treatment using a mouthpiece and associated components as described herein, according to some embodiments. As can be seen, a method for executing a dental treatment is provided herein, according to some embodiments, which may include one or more of the following steps: at step 1200, positioning a mouthpiece including one or more dental cover layers over upper and/or lower teeth; at step 1205, applying a vacuum to the dental cover layers so that a treatment cavity having a pressure below ambient pressure is formed around the upper and or lower teeth and/or surrounding gums respectively, thereby generating a fluid seal of the cover layer to the gum ridges; at step 1210, flowing one or more treatment materials into the sealed treatment cavity or cavities; at step 1215, cleaning the mouthpiece and/or anatomy of treatment materials, by flowing cleaning materials, such as water, optionally mixed with air at high velocity, into the mouthpiece and then flowing air alone to dry the teeth and or surrounding gums; at step 1220, considering whether to continue the treatment; if there is a need to continue the treatment session ("Yes"), at step 1225, the cycle is repeated, optionally using the same or new and/or alternative treatment materials, by returning to step 1210, optionally n times as per a pre-planned and/or dynamic treatment plan; if there is NO need to continue the treatment session ("No"), the treatment session is ended at step 1230.

In some embodiments, after step 1205, the system may verify the vacuum status, and either modify the vacuum pressure if required and/or modify the treatment protocol, if required, in relation to the actual vacuum pressure.

In some embodiments the system may verify vacuum status continuously throughout the treatment and may modify output of the vacuum pumps to maintain proper vacuum level throughout the treatment.

In some embodiments, if the vacuum level in the mouthpiece cannot be maintained at a proper level to assure fluid seal of the mouthpiece when flowing in materials or cleaning fluids, the system will automatically stop in-flow of material into the mouthpiece.

In some embodiments, step 905 is designed to maintain the integrity of the soft material of the mouthpiece at or adjacent to the hardened stiffening elements, to enable treatment cavities, pockets, zones or areas to be left intact in selected locations, for example, around selected teeth, gums, ridges etc. Further, step 1205 is designed to selectively collapse the soft material of the mouthpiece, to enable collapsed elements to provide a fluid seal at selected locations in the mouth, for example, around selected teeth, gums, ridges or selected portions of the gum ridges etc. In this way, treatment may be optimized, by creating selected treatment areas where treatment materials are optimally exposed, and where saliva is substantially prevented from entering, so as not to dilute or interfere with treatment materials. Further, treatment may be optimized, by creating safe zones where treatment materials are prevented from being exposed, thereby enhancing safety of gums, teeth etc. in these safe zones.

In some embodiments, at step 1210, new or alternative treatment materials may be flowed into the mouthpiece, to provide optimal amounts of active treatment materials.

In some embodiments, at step 1215, cleaning materials may include a water-air mixture, or alternative materials, liquids, gels etc., to enable removal of remaining treatment materials left on the mouthpiece, gum guard where present, and/or target teeth or tissues, optionally using high velocity flow, high temperature and/or other means to mechanically and/or chemically remove unwanted remains of treatment materials.

In some embodiments, at step 1215, flowing of cleaning materials may be followed by flowing of air into the mouthpiece, to enable drying of the mouthpiece, gum guard where present, and/or target teeth or tissues, to prepare a target surface for an additional treatment cycle, for example by removing any covering layers that may compromise exposure to treatment materials.

According to some embodiments, the running of one or more cycles may be a fully automated process, defined by a pre-set treatment protocol. In other embodiments, the running of one or more cycles may be a semi-automated process, defined by a treatment protocol. In other embodiments, the running of one or more cycles may be a manual process, defined by a treatment protocol. In still further embodiments, treatment cycle changes and modifications may be applied during a cycle and/or a treatment session. For example, if there is a need, a session or cycle can be paused or stopped, in which case the system may turn off and/or recalibrate, reset, review and continue the session when instructed.

In some embodiments, after step 1215 and/or 1230, treatment and/or cleaning waste materials may be stored in a waste unit and/or may be drained out of the system directly, optionally at the end of a treatment cycle and/or at the end of a treatment session.

Figure 13:
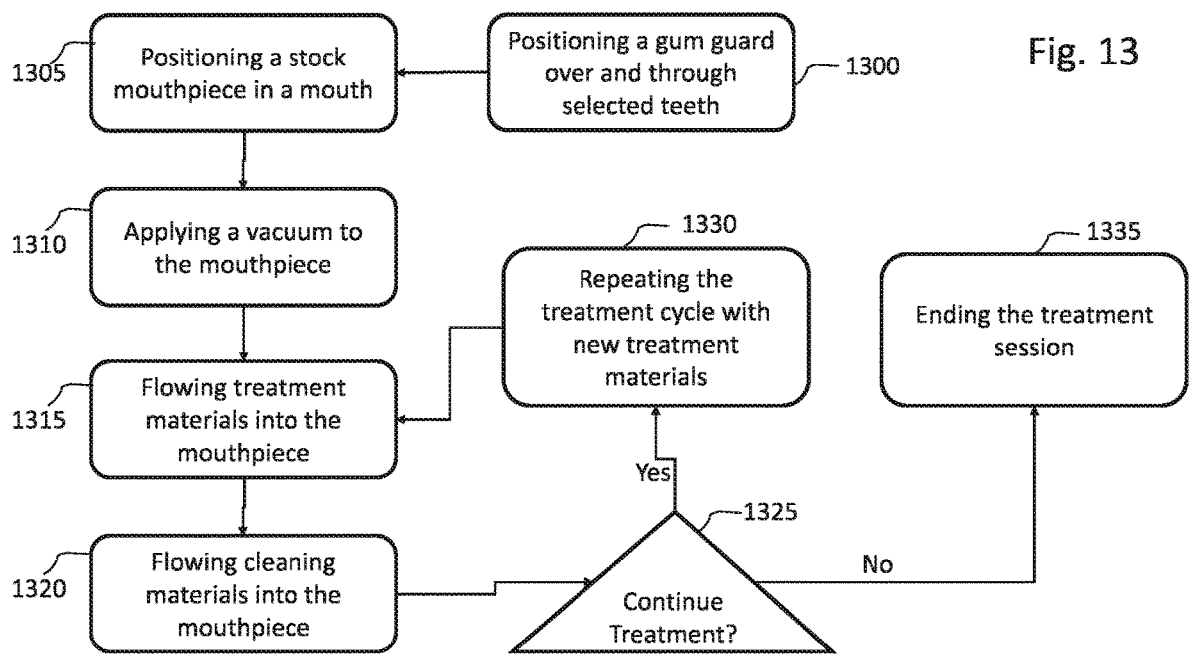
FIG. 13 is a flow chart describing an example of a process of implementing a tooth whitening treatment using a mouthpiece, gum guard, and associated components as described herein, according to some embodiments.

FIG. 13 is a flow chart describing an example of a process of implementing a tooth whitening treatment using a mouthpiece and associated components as described herein, according to some embodiments. As can be seen, a method for executing a dental treatment is provided herein, according to some embodiments, which may include one or more of the following steps: at step 1300, a gum guard is positioned over and through selected teeth, to expose the erupted portions of the teeth yet leave the surrounding gums protected; at step 1305, positioning a mouthpiece including one or more dental cover layers over upper and/or lower teeth; at step 1310, applying a vacuum to the dental cover layer so that a treatment cavity having a pressure below ambient pressure is formed around the teeth and/or surrounding gums, thereby generating a fluid seal; at step 1315, flowing one or more treatment materials into the sealed treatment cavity; at step 1320, cleaning the mouthpiece and/or anatomy of treatment materials, by flowing cleaning materials, such as water and or water mixed with air, and then flowing air alone optionally at high velocity, into the mouthpiece; at step 1325, considering whether to continue the treatment; if there is a need to continue the treatment session ("Yes"), at step 1330 the cycle is repeated, optionally using the same or new and/or alternative treatment materials, by returning to step 1315, optionally n times as per a pre-planned and/or dynamic treatment plan; if there is NO need to continue the treatment session ("No"), the treatment session is ended at step 1035.

Figure 14A:
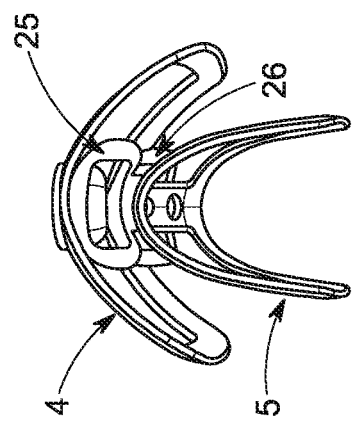
FIG. 14a is a front view of the mouthpiece 1 with a semi-embedded endoskeleton buccal stiffening element depicted, according to some embodiments.
Figure 14B:
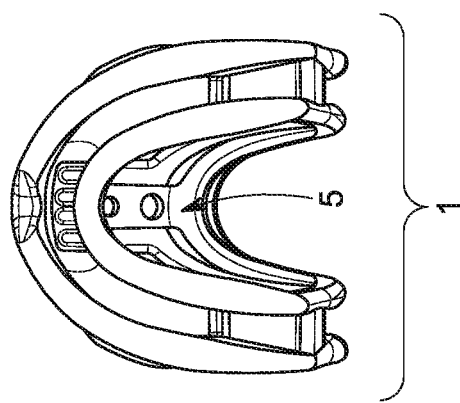
FIG. 14b is a top view of the mouthpiece 1 with a semi-embedded endoskeleton lingual stiffening element depicted, according to some embodiments.
Figure 14C:
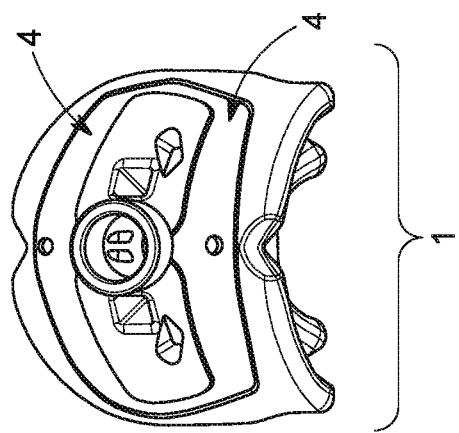
FIG. 14c is a top view of the endoskeleton stiffening elements, according to some embodiments.

FIG. 14*a* is a front view of the mouthpiece 1 with a semi-embedded endoskeleton buccal stiffening element depicted, according to some embodiments;

FIG. 14*b* is a top view of the mouthpiece 1 with a semi-embedded endoskeleton lingual stiffening element depicted, according to some embodiments; and FIG. 14*c* is a top view of endoskeleton stiffening elements, according to some embodiments. As can be seen, stiffening elements 4, 5, 25 and 26 are connected to each other as a unitary piece ready for over-molding of the soft body 2 (not depicted) of the mouthpiece 1. Also not depicted is the mouthpiece coupler which may be a separate part or could be connected to the above depicted endoskeleton parts to form one single rigid structure ready for over-molding.

In some embodiments, a pressure sensor may be incorporated in the pump mechanism to monitor the internal pressure inside the mouthpiece device throughout the treatment. In one example, increasing pressure inside the mouthpiece signifies degradation of the vacuum seal integrity and increase the potential risk that treatment materials will leak out of the mouthpiece and into the patient's mouth or alternatively, allow saliva to enter into the mouthpiece. Both possibilities are undesirable.

Chemically active treatment materials, such as whitening agents, may release, for example, oxygen during its oxidation/whitening reaction. This release of free oxygen from a gel may increase the internal pressure inside the mouthpiece device. In some embodiments, if the internal pressure (monitored by the pressure sensor and the microprocessor) reaches a critically high value, the patient may be told to bite down harder on the mouthpiece, while the occlusal stop bite resistors substantially maintain the integrity of the vacuum line despite the biting forces applied to the soft body of the mouthpiece, thereby allowing the system to automatically begin evacuating the treatment materials contained within the mouthpiece and either pump in water to rinse the teeth or alternatively, pump in new treatment material. Alternatively, removing overactive treatment material present in the mouthpiece with fresh treatment material(s) may help in decreasing the internal pressure inside the mouthpiece and so allow for continuing the treatment without the need to rinse the teeth.

The above described features of the system allow for the easy and rapid removal of treatment material and from the mouthpiece device so that upon removing the mouthpiece device from the patient, there remains little of the spent treatment material both in the mouthpiece device itself and on the enamel surfaces of the treated teeth. This simplifies the operator's task of removing any partially or completely spent treatment material from the patient's mouth. In some implementations, the controlled removal of the spent treatment materials may be automated by the control unit at the end of a set period of time or manually initiated by the operator's pressing a button which activates the removal/suctioning of the material at any time during the treatment.

More importantly, applying material in waves or pulses punctuated by washing/drying cycles between each material application allows the previously applied wave or pulse of material to be substantially removed and replaced with new fresh material. Using this application and removal method, it is possible to maximize the surface contact and exposure of the full volume available of the various treatment materials to the surfaces of the teeth and or surrounding gums.

In some embodiments, several applications (of a volume of gel required to fill the mouthpiece) of fresh treatment materials may be so applied and removed until the operator and patient are satisfied with the whitening or other treatment results are achieved. Of course, any combination of the above steps may be implemented. Further, other steps or series of steps may be used.

In the respective embodiments of the present invention, the above described design elements allow for the rapid, intense and controlled whitening of a dental arch or arches of both the anterior and posterior teeth simultaneously and the whitening of both the outer (buccal), inner (lingual) and occlusal (top/biting) surfaces of both the anterior and posterior teeth. These embodiments further enable effectively protecting the patient's soft tissues from the caustic effects of the various concentrations of whitening agents applied to the teeth, whilst optionally maintaining and monitoring in real time the safety, progress and/or comfort of the patient throughout the treatment.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

The principles and operation of the device, and method according to the present invention may be better understood with reference to the drawings, and the following description, it being understood that these drawings are given for illustrative purposes only and are not meant to be limiting, wherein:

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are not intended to cover all such modifications and changes as fall within the true spirit of the invention.

What is claimed is:

1. A device comprising:
 a mouthpiece suitable for implementing a dental treatment, wherein the mouthpiece comprises:
   i. one or more compressible dental cover sections suitable for forming one or more fluid sealed treatment cavities that are independent of, and unaffected by, any biting forces applied to the mouthpiece, wherein the one or more fluid sealed treatment cavities have a vacuum below ambient pressure when a vacuum force is internally applied to the one or more compressible dental cover sections, wherein each of the one or more compressible dental cover sections comprises at least one of: a section over the upper teeth and surrounding gums, and a section over the lower teeth and surrounding gums; and ii. one or more treatment supply sections, wherein the treatment supply section has one or more flow channels in fluid communication with the one or more fluid treatment cavities so that the treatment supply section can deliver and remove one or more treatment fluids from the one or more fluid sealed treatment cavities, wherein the delivery of the one or more treatment fluids into the one or more fluid sealed treatment cavities is physically separated from the removal of the one or more treatment fluids from the one or more fluid sealed treatment cavities, wherein each of the one or more compressible dental cover sections has attached one or more separate hardened rigid or semi-rigid sections that enable selective collapsibility of the dental cover sections that do not have the attached separate hardened or semi-rigid sections when exposed to a vacuum force;

wherein the one or more compressible dental cover sections incorporates one or more occlusal stop bite resistors inserted into the one or more compressible dental cover sections in order to resist the biting forces employed to engage and fluidly seal distal plugs; and wherein each of the one or more occlusal stop bite resistors comprises a hollow rigid vertical strut connected to two occlusal plane bite stops, wherein a first of the two occlusal plane bite stops is disposed on a superior terminal end of each of the one or more occlusal stop bite resistors, and wherein a second of the two occlusal plane bite stops is disposed on an inferior terminal end of each of the one or more occlusal stop bite resistors.

2. The device of claim 1, wherein the one or more hardened rigid or semi-rigid sections is an exo-skeleton coupled to the one or more compressible dental cover sections.

3. The device of claim 1, wherein the one or more hardened rigid or semi-rigid sections is an endo-skeleton partially or fully embedded in the one or more compressible dental cover sections.

4. The device of claim 1, wherein treatment materials are flowed onto both buccal and lingual/palatal aspects of the one or more fluid sealed treatment cavities and remain present on one or more surfaces of the teeth and surrounding gums when the internal vacuum force is applied and maintained to the mouthpiece treatment cavities.

5. The device of claim 1, wherein the one or more occlusal stop bite resistors are disposed internally in the one or more compressible dental cover sections to allow for full insertion of all surfaces of both (i) the upper teeth and surrounding gums, and (ii) the lower teeth and surrounding gums, into the one or more fluid sealed treatment cavities.

6. The device of claim 1, wherein the one or more occlusal stop bite resistors are configured to maintain a vacuum fluid seal of the one or more compressible dental cover sections when the biting forces are applied.

7. The device of claim 1, wherein the one or more occlusal stop bite resistors are configured to permit the delivery and removal of the one or more treatment fluids from the one or more treatment supply sections to the one or more fluid sealed treatment cavities when the biting forces are applied.

8. The device of claim 1, wherein the one or more flow channels are in fluid communication with different areas inside the one or more fluid sealed treatment cavities such that the delivery and removal of the one or more treatment fluids occurs when a vacuum force is internally applied to the one or more compressible dental cover sections and when the biting forces are applied.

9. The device of claim 1, wherein the one or more treatment supply sections comprises one or more heaters for heating at least one of: the one or more treatment fluids, and at least a portion of the one or more fluid sealed treatment cavities.

10. The device of claim 1, wherein the one or more treatment supply sections further comprises a handle integrated therein, wherein the handle is configured to perform a function selected from the group consisting of: inserting the one or more compressible dental cover sections over at least one of: the upper teeth and surrounding gums, and the lower teeth and surrounding gums, adjusting a position of the one or more compressible dental cover sections, removing the one or more compressible dental cover sections after a dental treatment is completed, connecting securely, via a fluid seal, to a heating unit connected to a fluid and/or vacuum supply line, and combinations thereof.

11. The device of claim 1, wherein the one or more compressible dental cover sections comprises a first dental cover section for covering the upper teeth and surrounding gums, and a second dental cover section for covering the lower teeth and surrounding gums, wherein at least a first treatment supply section in the one or more treatment supply sections is interposed between the first dental cover section and the second dental cover section to enable simultaneous treatment of (i) the upper teeth and surrounding gums, and (ii) the lower teeth and surrounding gums, and wherein the device further comprises: one or more breathing vents, disposed in the one or more treatment supply sections, configured to provide an air passage into the mouth during a dental treatment.

12. The device of claim 1, wherein the one or more compressible dental cover sections further comprises one or more compressible posterior cavity plugs configured to seal the one or more fluid sealed treatment cavities, thereby preventing flow of the one or more treatment fluids out of one or more rear sides of the one or more compressible dental cover sections.

13. The device of claim 1, further comprising: an elastomeric self-gripping dental gum guard barrier configured to selectively cover the upper and/or lower gum ridges, thereby providing additional protection against the one or more treatment fluids.

14. The device of claim 1, further comprising: a self-gripping dental gum guard barrier, wherein the self-gripping dental gum guard barrier comprises a gum treatment layer on at least one inner surface for delivery of one or more therapeutic material to the gums.

15. A device comprising:

a mouthpiece suitable for implementing a dental treatment, wherein the mouthpiece comprises:

i. one or more compressible dental cover sections suitable for forming one or more fluid sealed treatment cavities that are independent of, and unaffected by, any biting forces applied to the mouthpiece, wherein the one or more fluid sealed treatment cavities have a vacuum below ambient pressure when a vacuum force is internally applied to the one or more compressible dental cover sections, wherein each of the one or more compressible dental cover sections comprises at least one of: a section over the upper teeth and surrounding gums, and a section over the lower teeth and surrounding gums; and ii. one or more treatment supply sections, wherein the treatment supply section has one or more flow channels in fluid communication with the one or more fluid treatment cavities so that the treatment supply section can deliver and remove one or more treatment fluids from the one or more fluid sealed treatment cavities, wherein the delivery of the one or more treatment fluids into the one or more fluid sealed treatment cavities is physically separated from the removal of the one or more treatment fluids from the one or more fluid sealed treatment cavities, wherein each of the one or more compressible dental cover sections has attached one or more separate hardened rigid or semi-rigid sections that enable selective collapsibility of the dental cover sections that do not have the attached separate hardened or semi-rigid sections when exposed to a vacuum force, wherein the one or more compressible dental cover sections incorporates one or more occlusal stop bite resistors inserted into the one or more compressible dental cover sections in order to resist the biting forces employed to engage and fluidly seal distal plugs, wherein the vacuum below ambient pressure is formed by a sealing rim applying a continuous seal, wherein the sealing rim is formed of a compressible material and a plurality of sealing plugs disposed at one or more rear openings of the one or more compressible dental cover sections, wherein the continuous seal results in a fluid seal of the one or more fluid sealed treatment cavities when the vacuum force is internally applied to the one or more compressible dental cover sections and when the biting forces are applied to the mouthpiece independent of biting forces applied to the device, and wherein the one or more occlusal stop bite resistors are inserted into one or more vacuum tube bore holes in the one or more compressible dental cover sections, and wherein the one or more occlusal stop bite resistors are disposed proximally to the plurality of sealing plugs.

16. The device of claim 15, wherein the continuous seal prevents saliva from entering the one or more fluid sealed treatment cavities and prevents any treatment material placed into the one or more fluid sealed treatment cavities from exiting the one or more fluid sealed treatment cavities.

17. A method for executing dental treatments, the method comprising:
  positioning a mouthpiece over (i) upper teeth and surrounding gums, and (ii) lower teeth and surrounding gums;
  positioning one or more occlusal stop bite resistors into the mouthpiece;
  applying a fluid sealed vacuum to the one or more dental cover sections such that one or more fluid sealed treatment cavities having a pressure below ambient pressure is formed around all of the teeth and surrounding gums;
  flowing one or more treatment materials into the one or more fluid sealed treatment cavities, wherein the one or more dental cover sections has attached one or more separate rigid or semi-rigid hardened sections for enabling selected and/or differential collapsibility of the mouthpiece when the mouthpiece is exposed to the applied vacuum; and
  flowing out the one or more treatment materials from the one or more fluid sealed treatment cavities into a waste container,
  wherein the mouthpiece is suitable for implementing a dental treatment, wherein the mouthpiece, after the positioning of the one or more occlusal stop bite resistors into the mouthpiece, comprises:
    i. one or more compressible dental cover sections suitable for forming one or more fluid sealed treatment cavities that are independent of, and unaffected by, any biting forces applied to the mouthpiece, wherein the one or more fluid sealed treatment cavities have a vacuum below ambient pressure when a vacuum force is internally applied to the one or more compressible dental cover sections, wherein each of the one or more compressible dental cover sections comprises at least one of: a section over the upper teeth and surrounding gums, and a section over the lower teeth and surrounding gums; and
    ii. one or more treatment supply sections, wherein the treatment supply section has one or more flow channels in fluid communication with the one or more fluid treatment cavities so that the treatment supply section can deliver and remove one or more treatment fluids from the one or more fluid sealed treatment cavities, wherein the delivery of the one or more treatment fluids into the one or more fluid sealed treatment cavities is physically separated from the removal of the one or more treatment fluids from the one or more fluid sealed treatment cavities,
  wherein each of the one or more compressible dental cover sections has attached one or more separate hardened rigid or semi-rigid sections that enable selective collapsibility of the dental cover sections that do not have the attached separate hardened or semi-rigid sections when exposed to a vacuum force,
  wherein the one or more compressible dental cover sections incorporates one or more occlusal stop bite resistors inserted into the one or more compressible dental cover sections in order to resist the biting forces employed to engage and fluidly seal distal plugs, and
  wherein each of the one or more occlusal stop bite resistors comprises a hollow rigid vertical strut connected to two occlusal plane bite stops, wherein a first of the two occlusal plane bite stops is disposed on a superior terminal end of each of the one or more occlusal stop bite resistors, and wherein a second of the two occlusal plane bite stops is disposed on an inferior terminal end of each of the one or more occlusal stop bite resistors.

18. The method of claim 17, further comprising at least one of:
  connecting a pump to the mouthpiece;
  configuring teeth whitening treatment settings on a control device coupled to a pump connected to the mouthpiece;
  selectively applying upper and lower self-gripping gum guard barrier devices on to portions of the gum ridges where erupted teeth remain substantially exposed;
  inserting the mouthpiece with the one or more occlusal stop bite resistors into a patient's mouth and applying flow control to cause a vacuum fluid seal between the mouthpiece and the patient's gum ridges, wherein the gum ridges are covered by one or more self-gripping gum guard barrier devices; and
  automatically managing delivery of the one or more treatment materials in accordance with one or more treatment settings, and/or using a flow control module to remove the one or more treatment materials from the mouthpiece.

* * * * *